July 12, 1955    H. E. GRIESEMER    2,712,837
WELDED WIRE MESH FABRICATING MACHINE
Filed Feb. 11, 1950    15 Sheets-Sheet 1

Inventor
Harry E. Griesemer
by [signature] Attys

July 12, 1955

H. E. GRIESEMER 2,712,837

WELDED WIRE MESH FABRICATING MACHINE

Filed Feb. 11, 1950

Inventor
Harry E. Griesemer
by
Attys

July 12, 1955 — H. E. GRIESEMER — 2,712,837
WELDED WIRE MESH FABRICATING MACHINE
Filed Feb. 11, 1950 — 15 Sheets-Sheet 3

Inventor
Harry E. Griesemer
by [signature] Attys

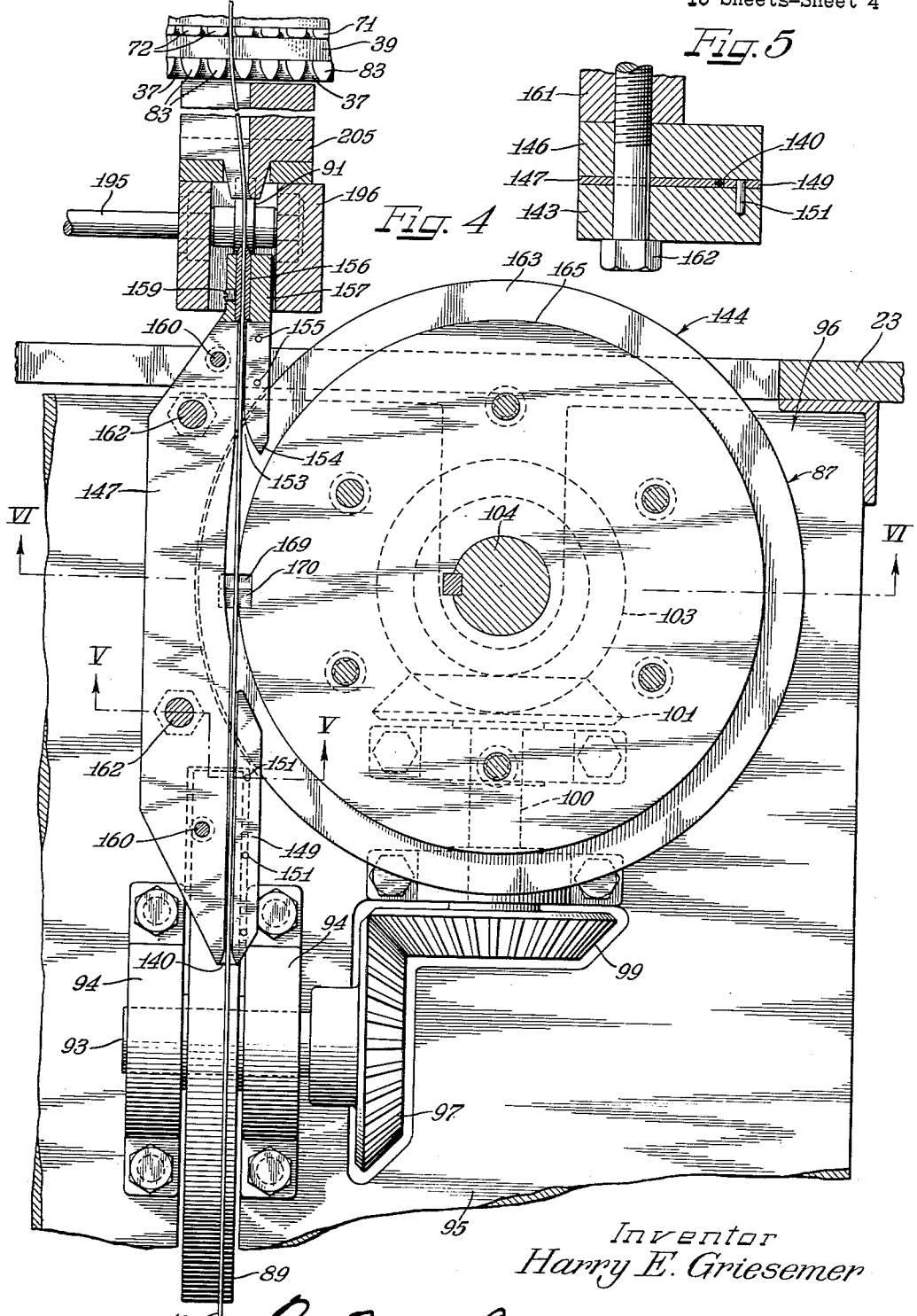

July 12, 1955  H. E. GRIESEMER  2,712,837
WELDED WIRE MESH FABRICATING MACHINE
Filed Feb. 11, 1950  15 Sheets-Sheet 5
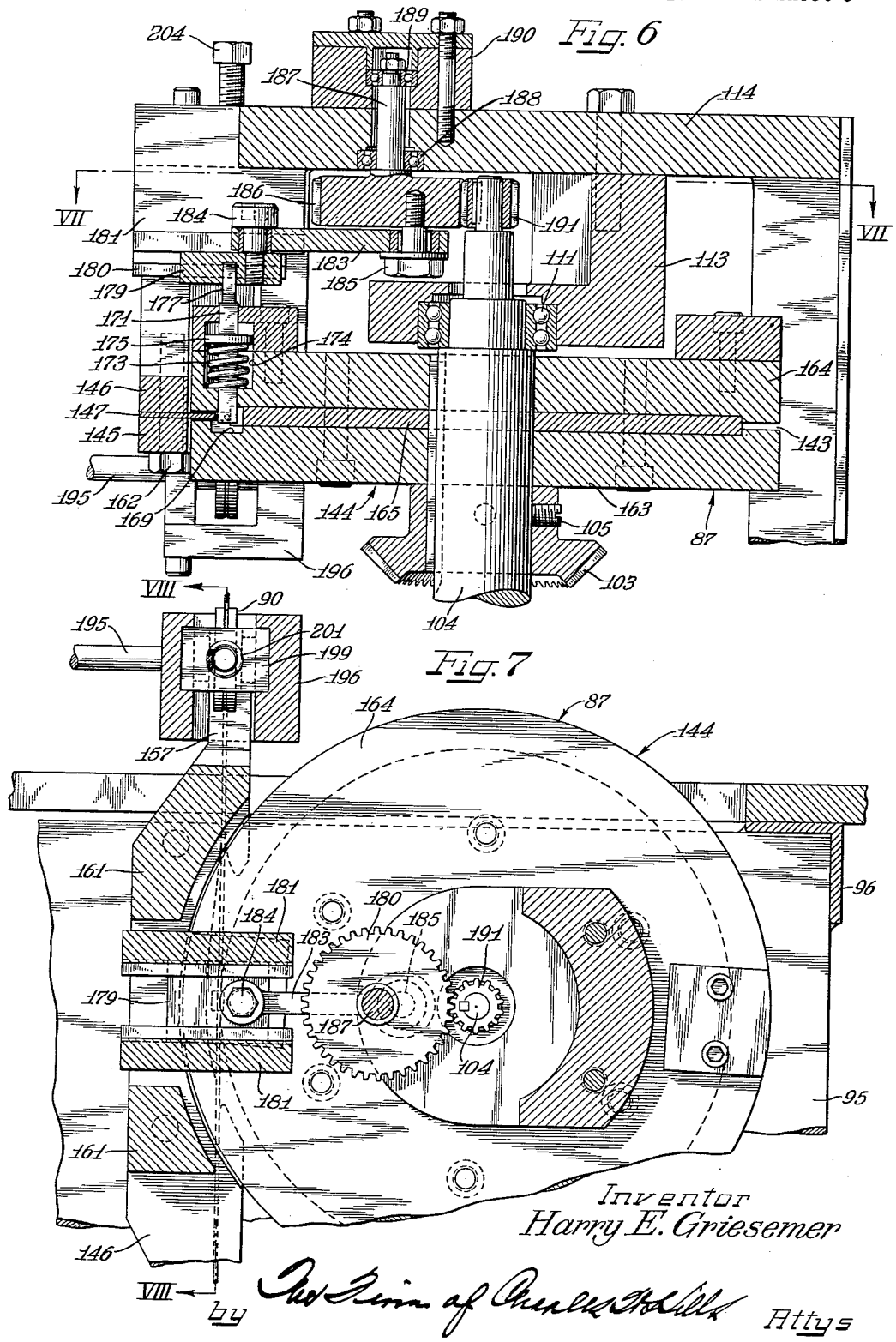

July 12, 1955  H. E. GRIESEMER  2,712,837
WELDED WIRE MESH FABRICATING MACHINE
Filed Feb. 11, 1950  15 Sheets-Sheet 6
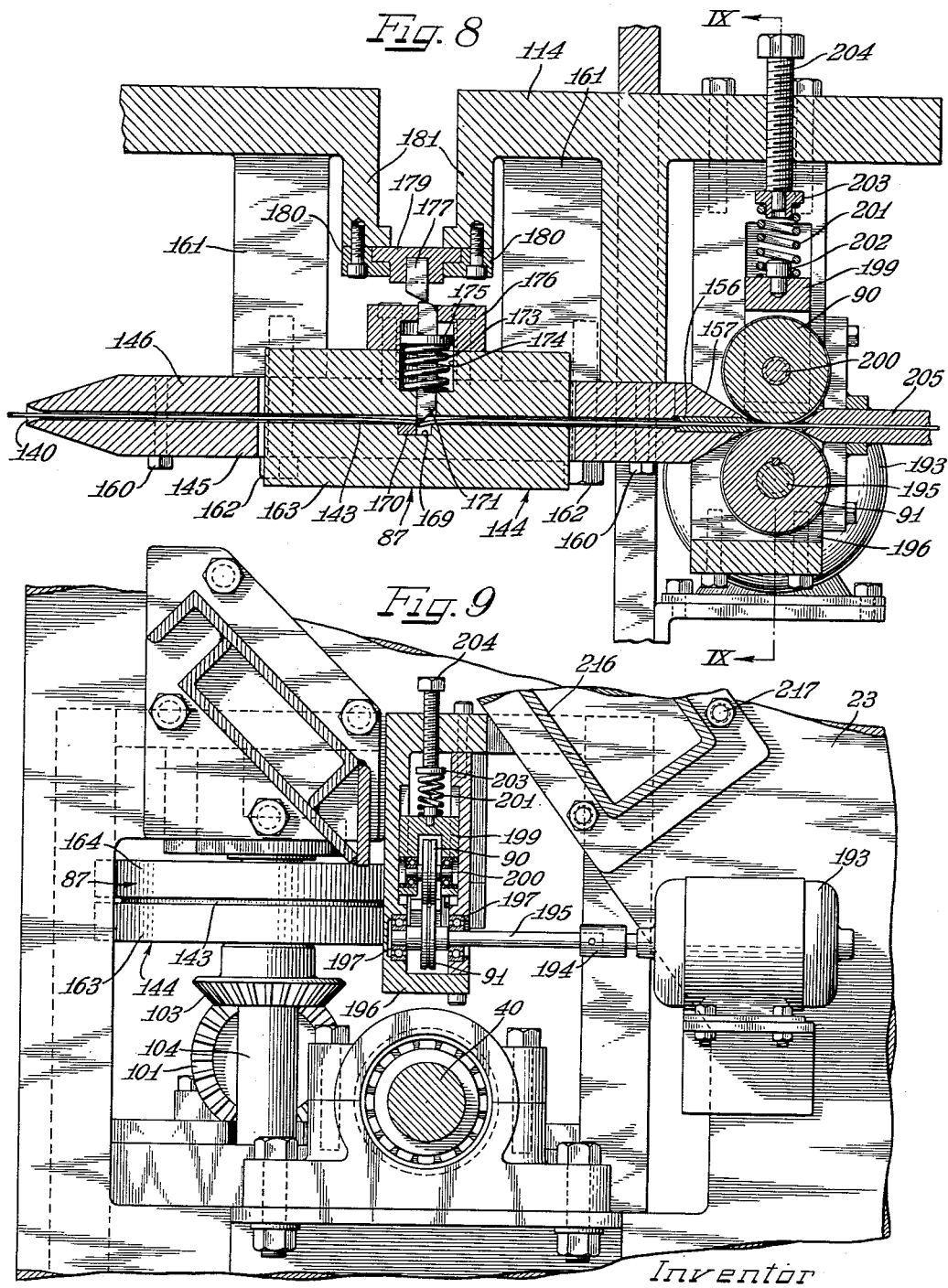

July 12, 1955
H. E. GRIESEMER
2,712,837
WELDED WIRE MESH FABRICATING MACHINE
Filed Feb. 11, 1950
15 Sheets-Sheet 7
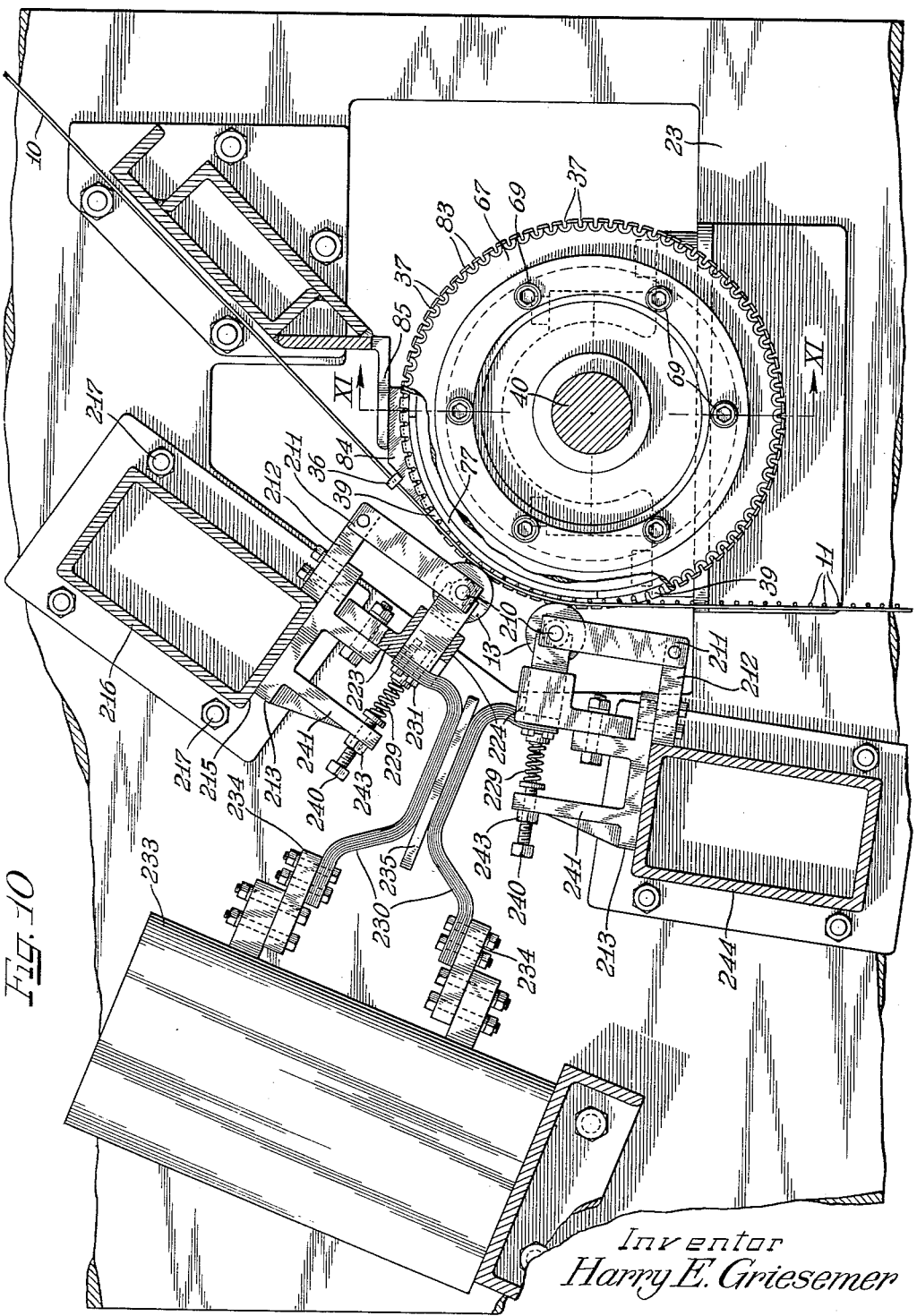
Inventor
Harry E. Griesemer
by
Attys July 12, 1955 H. E. GRIESEMER 2,712,837
WELDED WIRE MESH FABRICATING MACHINE
Filed Feb. 11, 1950 15 Sheets-Sheet 8

Inventor
Harry E. Griesemer
by The Firm of Charles A... Attys

July 12, 1955 H. E. GRIESEMER 2,712,837
WELDED WIRE MESH FABRICATING MACHINE
Filed Feb. 11, 1950 15 Sheets-Sheet 9
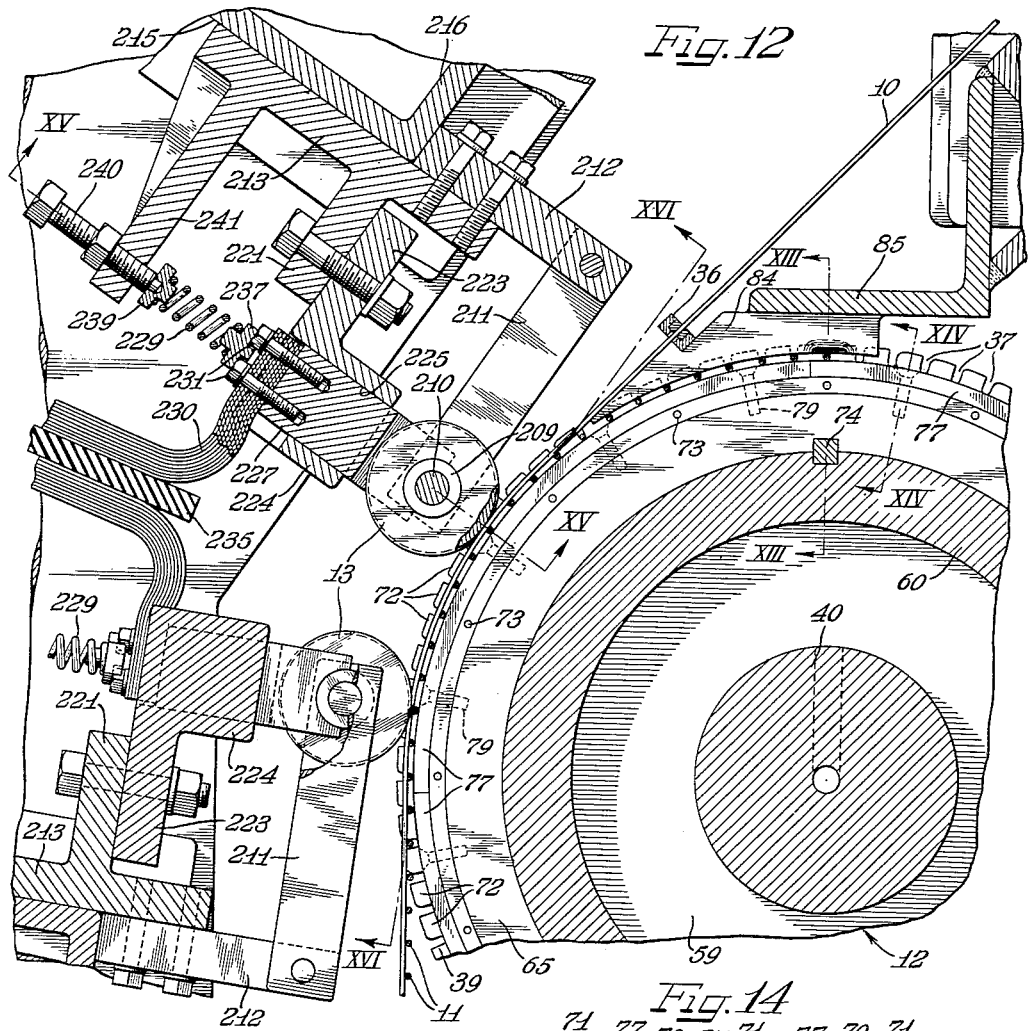
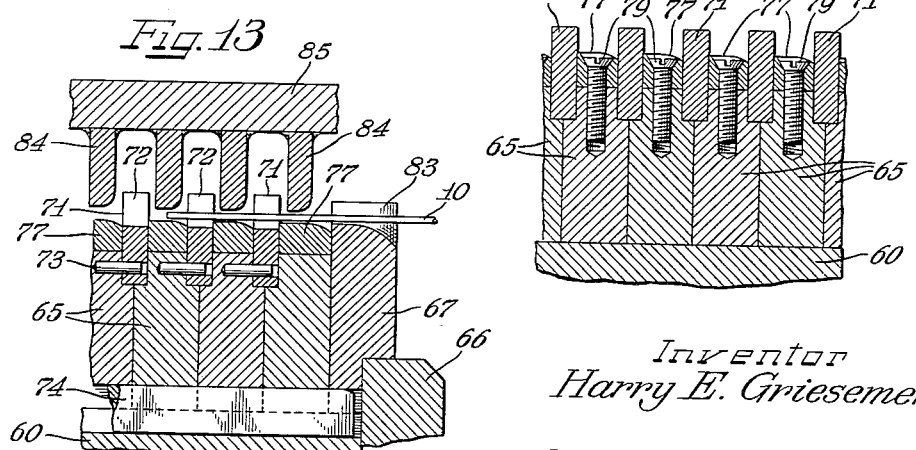
Inventor
Harry E. Griesemer
by Attys

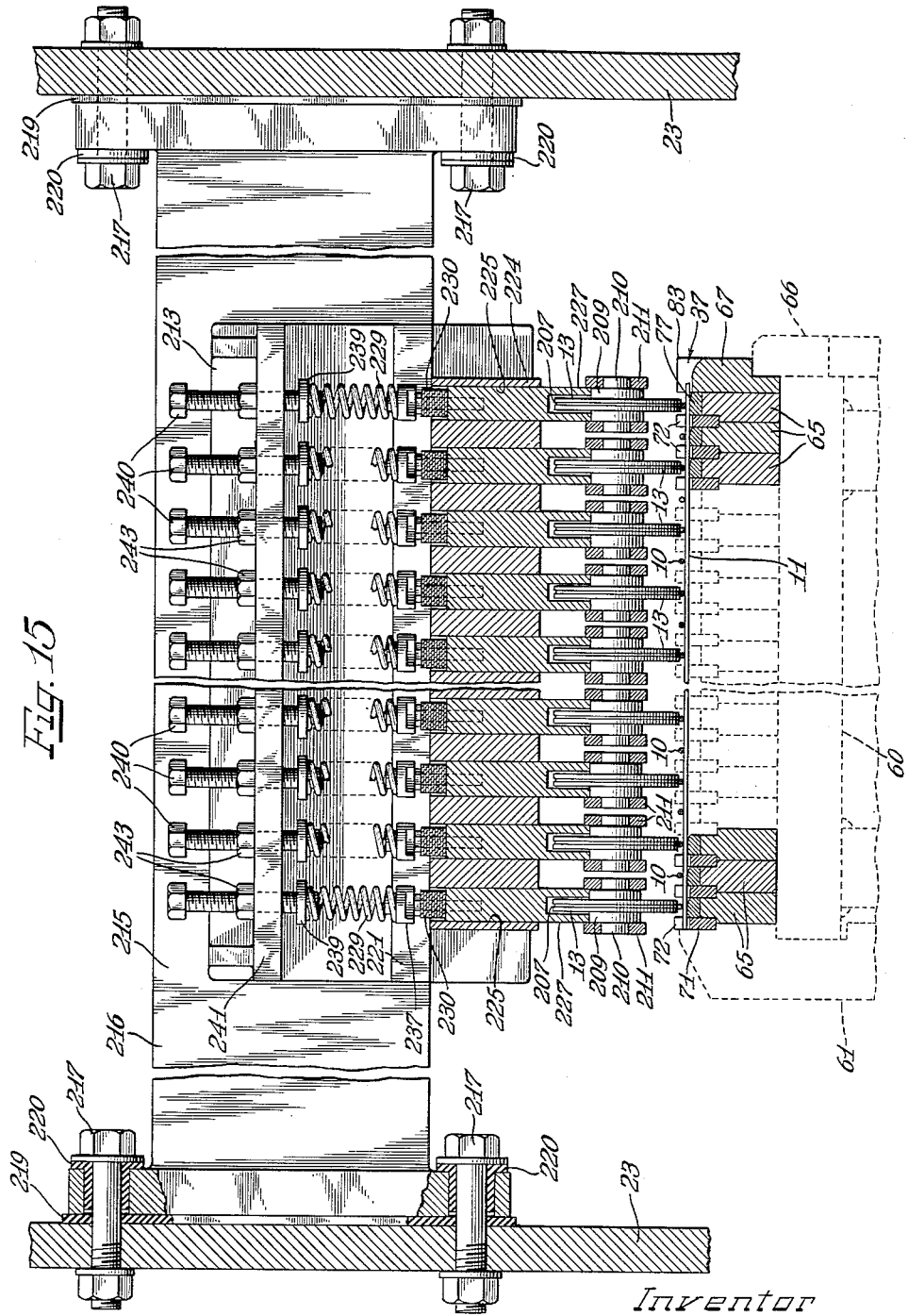

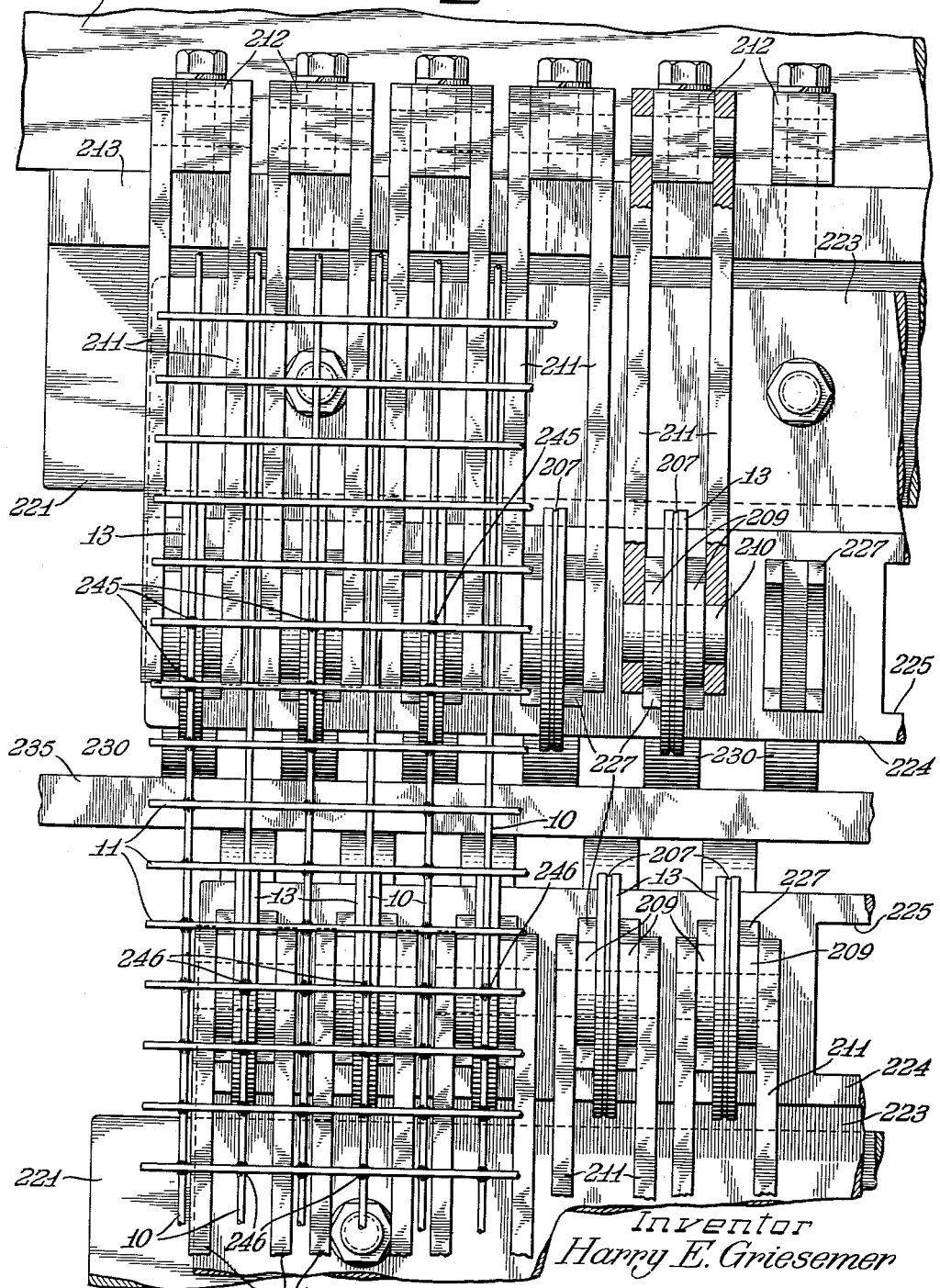

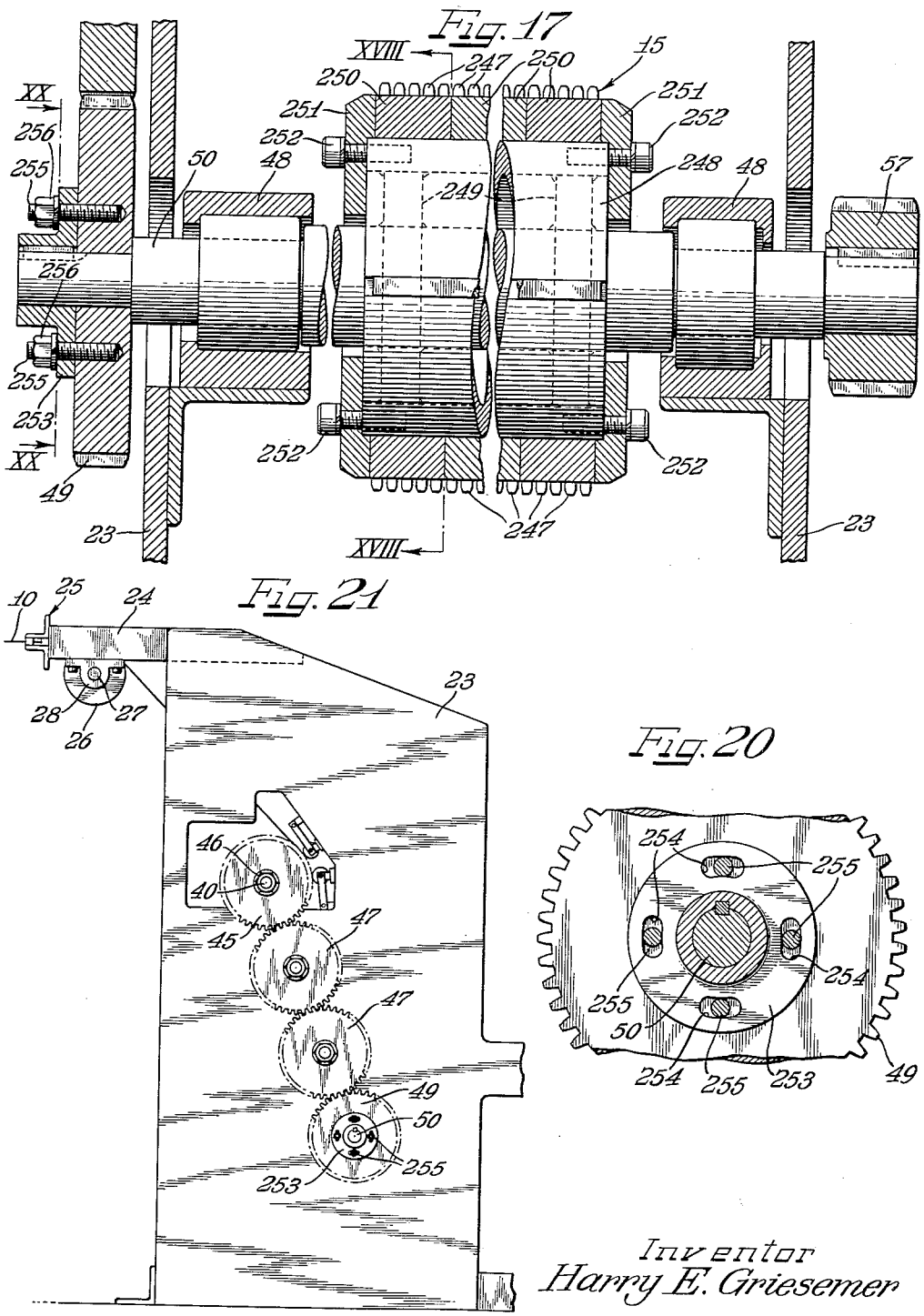

July 12, 1955 H. E. GRIESEMER 2,712,837
WELDED WIRE MESH FABRICATING MACHINE
Filed Feb. 11, 1950 15 Sheets-Sheet 13
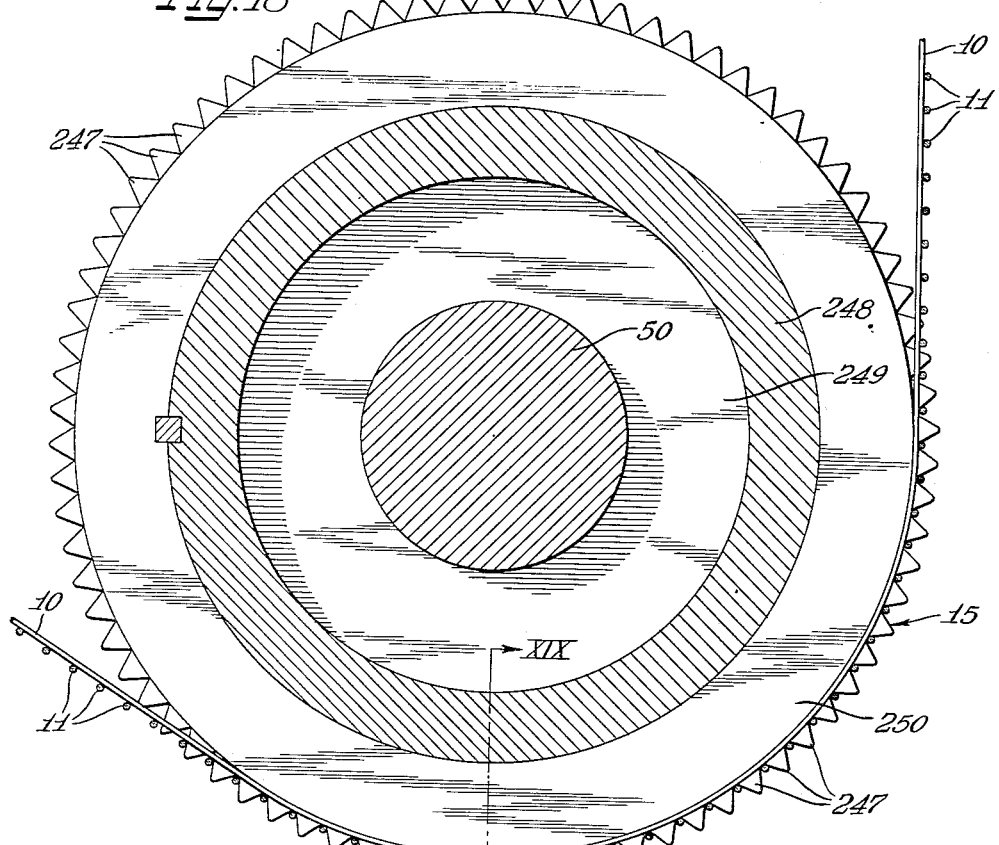
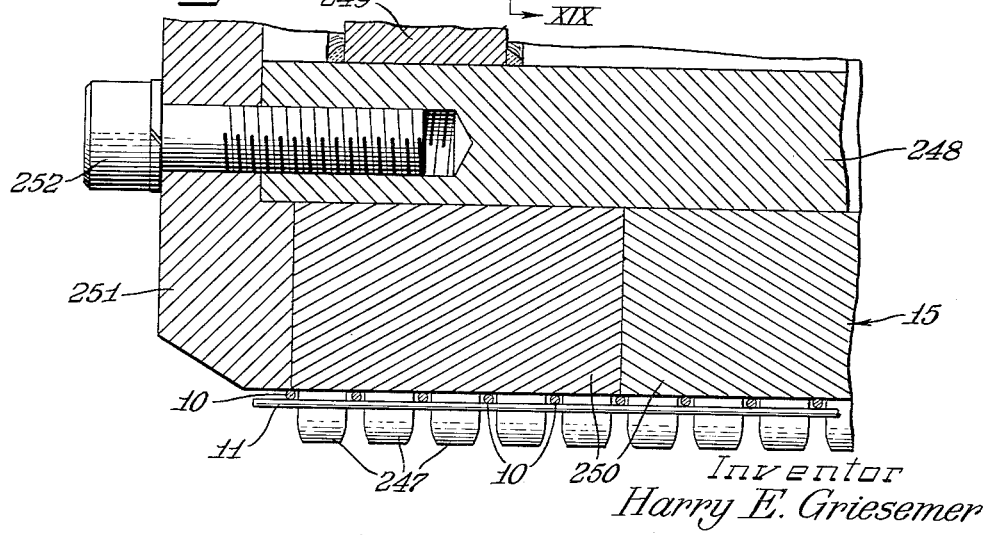
Inventor
Harry E. Griesemer
by The Firm of Charles A. Hill
Attys July 12, 1955 H. E. GRIESEMER 2,712,837
WELDED WIRE MESH FABRICATING MACHINE
Filed Feb. 11, 1950 15 Sheets-Sheet 14

Inventor
Harry E. Griesemer
by The Firm of Charles K. Will Attys

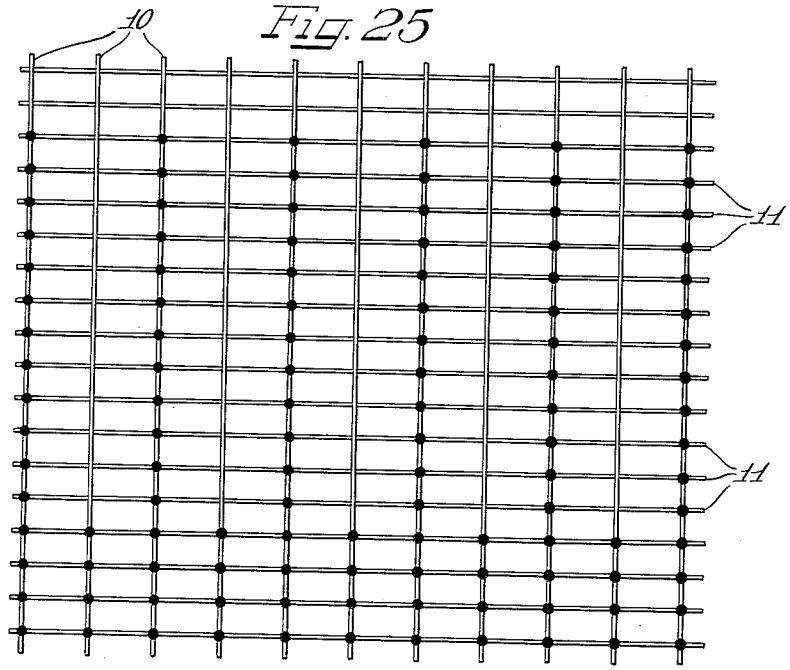
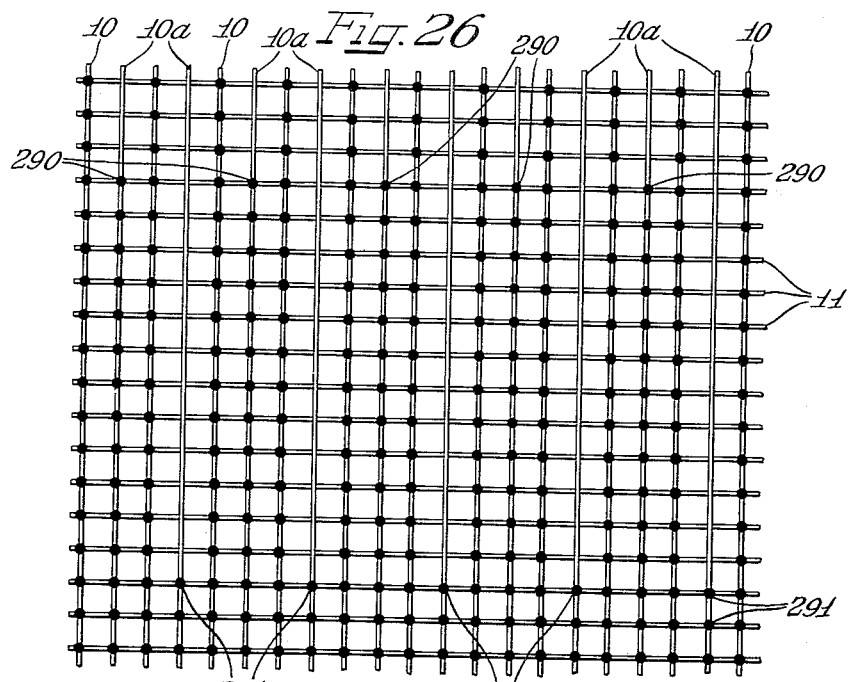

United States Patent Office 2,712,837
Patented July 12, 1955

2,712,837

WELDED WIRE MESH FABRICATING MACHINE

Harry E. Griesemer, Bloomington, Ill., assignor to Northwestern Steel and Wire Company, Sterling, Ill., a corporation of Illinois Application February 11, 1950, Serial No. 143,755

17 Claims. (Cl. 140—112)

This invention relates to a new and improved apparatus for fabricating welded wire mesh fabric and has as its objects to provide such a machine wherein the wire mesh may be fabricated in a continuous operation from a plurality of continuous strands of wire.

Another object of my invention is to provide a novel form of wire mesh fabricating machine in which line wires are trained over the cross or stay wires and are welded thereto without interrupting the operation of the machine.

Still another object of my invention is to provide a novel form of wire mesh fabricating machine of a simple and rugged construction having an improved means for automatically bringing the cross or stay wires into position to be contacted with the longitudinal line wires.

A further object of my invention is to provide a wire mesh fabricating machine of a simple and efficient construction, continuously measuring and cutting cross wires to length and advancing the cross wires for engagement with and welding to a plurality of parallel spaced continuously advancing traveling line wires.

A still further object of my invention is to provide an improved form of welded wire mesh fabricating machine comprising a continuously moving magazine storing a plurality of cross wires and bringing the cross wires into position to be engaged by the line wires, with means for continuously supplying cross wires to the magazine during travel thereof and other means for guiding a plurality of traveling line wires for engagement with the cross wires on the moving magazine and bonding the same by welding.

A still further object of my invention is to provide a machine for fabricating wire mesh having a plurality of uniformly spaced cross wires with a plurality of parallel spaced line wires welded thereto consisting of a continuous rotating cross wire supplying magazine, with means for measuring and cutting from a continuously moving strand of wire cross wires of a predetermined length and feeding the cross wires to the rotating magazine for welding to the line wires.

A still further object of my invention is to provide a simple and efficient wire mesh welding machine arranged to continuously supply cross wires in a predetermined spacing and to weld the line wires to the cross wires in a continuous operation in a simpler and more expeditious manner than formerly.

These and other objects of my invention will appear from time to time as the following specification proceeds and with reference to the accompanying drawings wherein:

Figure 4 is an enlarged horizontal fragmentary sectional view taken substantially along the line IV—IV of Figure 3;

Figure 5 is an enlarged fragmentary detail sectional view taken substantially along line V—V of Figure 4 and showing certain details of the guide for guiding the wire for shearing;

Figure 6 is an enlarged fragmentary longitudinal sectional view taken substantially along line VI—VI of Figure 4;

Figure 7 is an enlarged fragmentary horizontal sectional view taken substantially along line VII—VII of Figure 6;

Figure 8 is an enlarged fragmentary transverse sectional view taken substantially along line VIII—VIII of Figure 7 and showing certain details of the shearing mechanism for the wire not shown in Figure 7;

Figure 9 is a fragmentary longitudinal sectional view taken substantially along line IX—IX of Figure 8 and showing certain details of the means for feeding the wire to the magazine;

Figure 10 is an enlarged fragmentary longitudinal sectional view taken substantially along line X—X of Figure 3 and showing certain details of the cross wire magazine and the rolling electrodes for bonding the line wires with the cross wires by welding;

Figure 12 is a fragmentary sectional view taken substantially along line XII—XII of Figure 11 in order to show certain details of the cross wire magazine not shown in Figures 10 and 11;

Figure 13 is an enlarged fragmentary detailed sectional view taken substantially along line XIII—XIII of Figure 12 and showing certain details of the guide and retaining means for the cross wires on the cross wire magazine;

Figure 14 is an enlarged fragmentary detail sectional view taken substantially along line XIV—XIV of Figure 12 and showing in particular the circumferential line wire receiving slots and the method of holding the electrodes forming the bottoms of said slots to the magazine drum;

Figure 15 is an enlarged fragmentary sectional view taken substantially along line XV—XV of Figure 12;

Figure 16 is an enlarged detailed fragmentary sectional view taken substantially along the line XVI—XVI of Figure 12 and looking upwardly at the wire mesh from the inner side thereof;

Figure 17 is an enlarged fragmentary sectional view taken along the axis of rotation of the drum for drawing the line wires over the cross wires on the magazine and for drawing the fabricated mesh therefrom;

Figure 18 is a sectional view taken substantially along line XVIII—XVIII of Figure 17;

Figure 19 is an enlarged detail fragmentary sectional view taken substantially along line XIX—XIX of Figure 18;

Figure 20 is a fragmentary sectional view taken substantially along line XX—XX of Figure 17;

Figure 21 is an enlarged fragmentary side view of the machine shown in Figures 1 and 2 and illustrating certain details of the drive connection between the magazine and drawing roll;

Figure 22 is an enlarged fragmentary sectional view taken substantially along line XXII—XXII of Figure 2 and illustrating certain details of the guide for the line wires at the entering end of the machine;

Figure 23 is an enlarged fragmentary sectional view taken substantially along line XXIII—XXIII of Figure 22;

Figure 25 is a view of the mesh pattern as formed in the first stage of the apparatus shown in Figure 24; and Figure 26 is a view of the mesh pattern as formed in the second stage of the apparatus shown in Figure 24.

The machine in general

Figure 1:
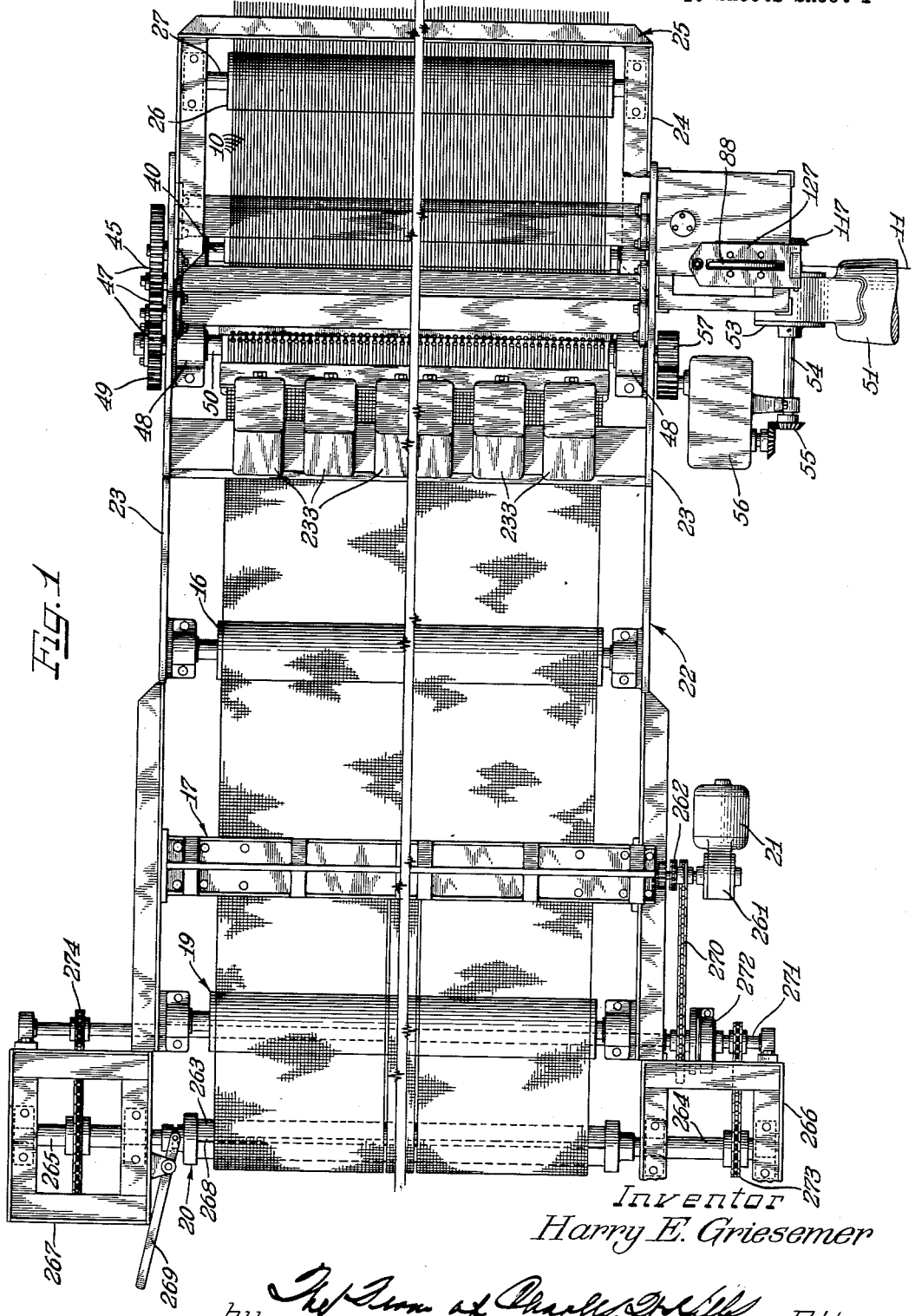
Figure 1 is a fragmentary plan view of a wire mesh fabricating machine constructed in accordance with my invention.

Referring now to the drawings, the reference numeral 10 indicates a line wire, the number and spacing of which may vary in accordance with the nature of the fabric to be made. The line wires 10 are guided to pass over stay or cross wires 11—11, measured, cut and supplied to a rotating magazine 12 and pressed into engagement with said magazine by the line wires 10—10 by means of alternately arranged circumferentially spaced rotating electrodes 13—13, the upper electrodes of which engage every other line wire and the lower electrodes of which engage the intermediate line wires and bond the line wires to the cross wires by resistance welding in a well known manner.

From the magazine 12 the fabric formed by the welding of the line wires to the cross wires passes under a tailing drum 15 driven at the peripheral speed of the magazine 12 and partially wrapping the line wires around the magazine 12 and drawing the fabricated mesh from said magazine. From the tailing drum 15 the fabricated mesh passes upwardly in an inclined direction to and over an idler roll 16 to a slitter or trimmer 17 for trimming the edges of the mesh and cutting the mesh longitudinally into two sections of uniform width when desired. The longitudinally slit mesh may then pass over an idler roll 19 into engagement with a baler or coiler 20 rotatably driven from the motor 21 in a manner which will hereinafter be described as this specification proceeds. The baler 20 serves to coil the finished mesh, the mesh being cut transversely to the desired length after it is trimmed and longitudinally slit.

Figure 2:
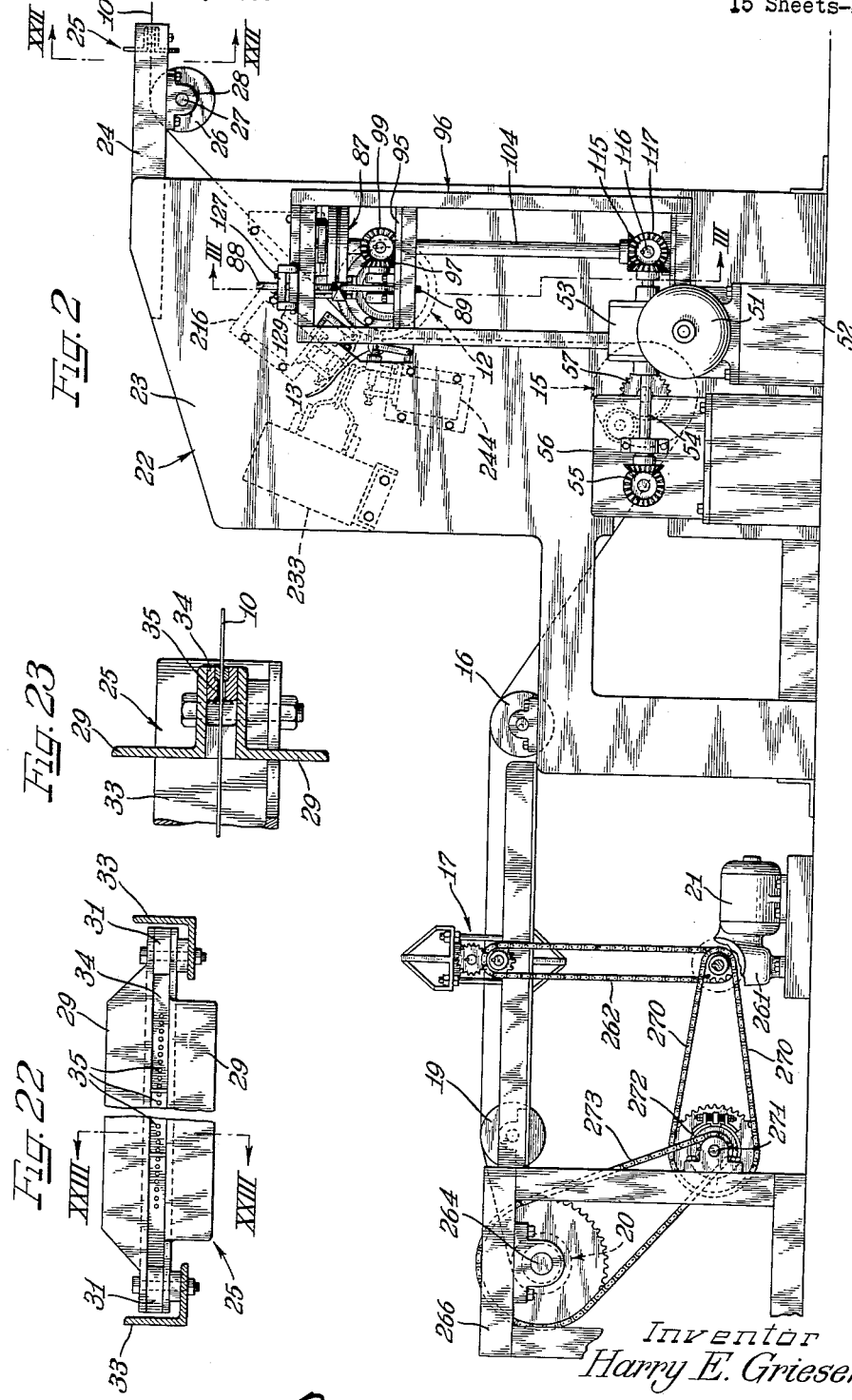
Figure 2 is a view in side elevation of the machine shown in Figure 1.

The machine includes generally a frame structure 22 made up of parallel spaced upright frame members 23—23 suitably connected together and having an outboard support bracket 24 projecting from the upper end thereof toward the coiled line wire (not shown) to be threaded through the machine. A line wire guide 25 is mounted at the advance end of the bracket 24 and an idler drum 26 is journaled between the sides of said bracket 24 rearwardly of the guide 25 on a transverse shaft 27 journaled in bearing blocks 28—28 secured to and depending from opposite sides of said bracket (Figures 1 and 2).

The line wire guide 25, as herein shown, includes two vertically spaced transversely extending angles 29—29 spaced apart at their outer ends by spacers 31—31. The guide 25 and angles 29—29 are secured to the horizontal legs of angles 33—33 secured to the inside of opposite side frame members of the outboard support 24 and forming a part thereof. The horizontal legs of the angles 29—29 are also spaced apart by a cross bar 34 extending between the spacers 31—31 and having a plurality of uniformly spaced apertures 35—35 extending horizontally therethrough, through which the line wires are trained in parallel spaced relation with respect to each other.

The line wires 10—10 also pass through corresponding apertures formed in a guide and spacing member 36 extending across the magazine 12 at the receiving end thereof and having the apertured portions thereof arranged tangentially to the periphery of said magazine. The guide and spacing member 36 guides the line wires 10—10 to pass over the cross wires 11—11 in transverse slots 37—37. The cross wire storing slots 37—37 are uniformly spaced around the magazine 12 and the line wires are wrapped partially around said magazine in circumferential line wire slots 39—39, intersecting the cross wire slots and uniformly spaced apart along the magazine 12. The bottoms of the circumferential line wire receiving slots 39—39 form a bridge for the current during the welding operation, as will hereinafter more clearly appear as this specification proceeds.

Drive to magazine and tailing drum

Figure 11:
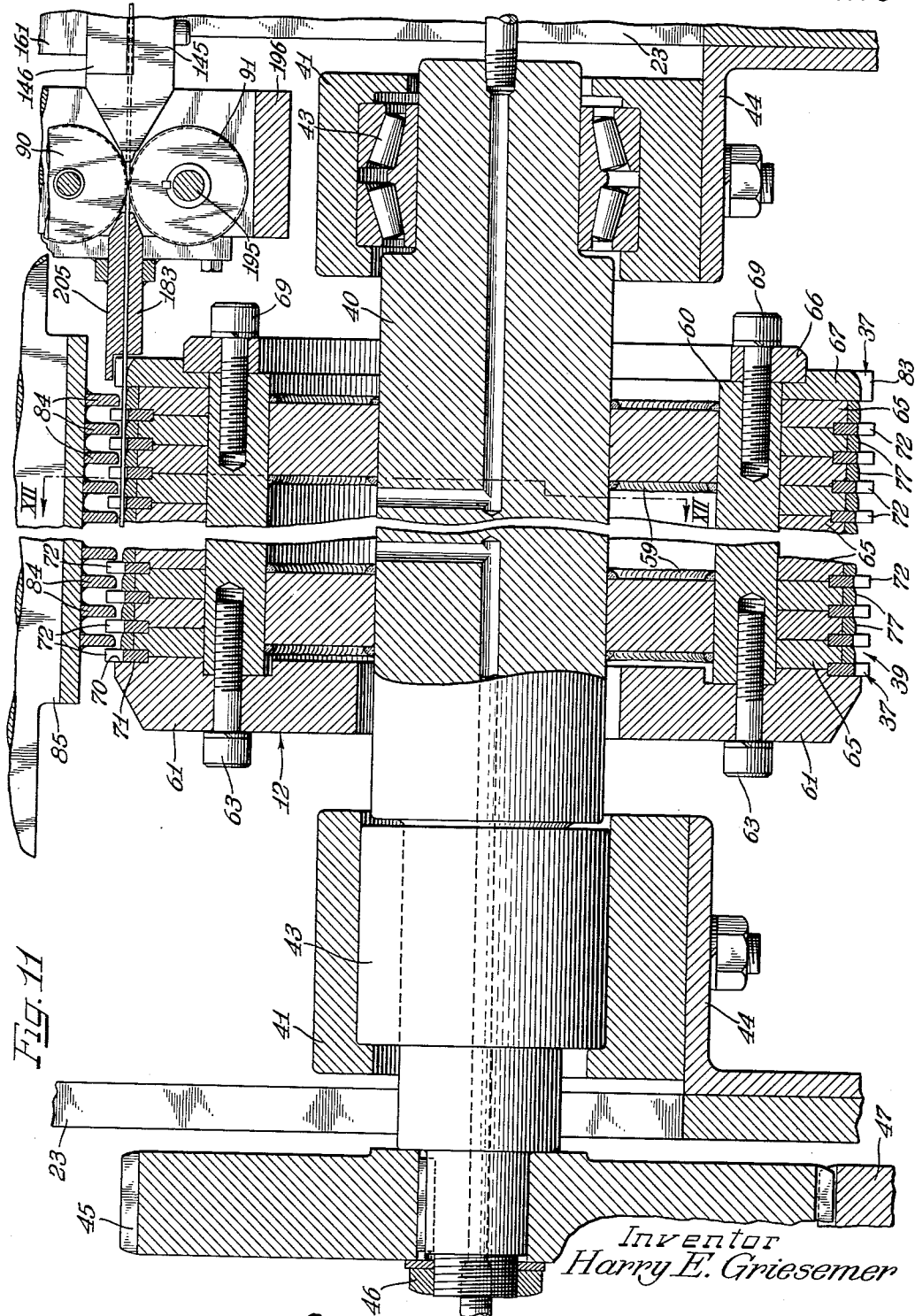
Figure 11 is an enlarged fragmentary sectional view taken substantially along line XI—XI of Figure 10 and showing certain details of the rotating cross wire magazine not shown in Figure 10.

The magazine 12 for the cross wires 11—11 is herein shown as being in the form of a drum slightly wider than the width of the mesh to be fabricated, and mounted on a transverse shaft 40 (Figure 11). The shaft 40 is journaled adjacent its ends in bearing supports 41—41 on roller bearings 43—43. The bearing supports 41—41 are herein shown as being secured to the horizontal legs of angles 44—44 secured to the insides of the frame members 23—23 and projecting inwardly therefrom. One end of the transverse shaft 40 extends outwardly through the associated frame member 23, beyond the outer side thereof, and has a spur gear 45 keyed thereto. A nut 46, threaded on the end of said shaft, serves to secure said gear to said shaft. The spur gear 46 is herein shown as meshing with and being driven from a train of meshing idler gears 47—47 of the same diameter as the spur gears 45, the first of which idler gears meshes with and is driven from a spur gear 49 of the same diameter as said idler gears and is secured to and driven from a transverse shaft 50 forming the support and drive shaft for the tailing drum 15 (Figures 17 and 20).

The shaft 50 is journaled in bearing support members 48—48 supported on the insides of the side frame members 23—23 and extending outwardly beyond said side frame members. A motor 51 on a base 52 extending outwardly from the side plate 23 opposite from the spur gear 49 is provided to drive the shaft 50 (Figures 1 and 2). The motor 51 is herein shown as having a speed reducer 53 incorporated therein which drives a longitudinal shaft 54 extending in opposite directions from said speed reducer. A pair of miter gears 55 driven from one end of the shaft 54 drive a speed reducer 56 for the drum 15 and magazine 12. A spur gear train 57 connects the speed reducer 56 with the transverse shaft 50 and drives said shaft therefrom.

Cross wire magazine

The drum forming the magazine 12 is shown in Figure 11 as being made from a plurality of spaced annular webs 59—59 secured to the shaft 40 in spaced relation with respect thereto as by welding and having a cylindrical drum 60 welded to the outer peripheries thereof. An annular retaining member 61 is secured to the end of the drum 60 adjacent the spur gear 45 as by cap screws 63—63 threaded in said drum and closes the far ends of the transverse slots 37—37. The annular retaining member 61 extends outwardly from the periphery of the drum 60 and serves as an abutment member for a plurality of annular rings 65—65 encircling the drum 60 and held thereto by an annular retaining ring 66 abutting an advance end ring 67 of the magazine. The retaining ring 66 abuts an inner advance shouldered portion of the ring 67 and is held in engagement therewith by cap screws 69—69 threaded in the advance end of the drum 60.

The advance face of the retaining member 61 is provided with an outer shouldered portion 70 adapted to be abutted by an annular ring 71 having a plurality of uniformly spaced lugs or teeth 72 extending therearound and curved at the advance ends thereof to guide the cross wires in the spaces therebetween. The spaces between the teeth 72—72 of the aligned rings 71—71 form the cross wire receiving slots 37—37 as may best be seen with reference to Figures 3, 4 and 12. Each annular ring 65 likewise has similar shoulder portions formed on opposite outer sides thereof abutting and supporting the toothed rings 71—71 throughout the length of the drum 60. The rings 71—71 have locating pins 73—73 mounted therein and projecting therefrom for engagement with registering apertures formed in the annular rings 65—65 to register the teeth 72—72 of all of said rings (Figure 13). The annular rings 64—64 are aligned on the drum 60 and are driven therefrom by means of a key 74.

The bottoms of the circumferential slots 39—39 are formed by a plurality of abutting annular segments 77—77 mounted in the spaces between the toothed rings 71—71. The segments 77—77 are secured to the outer peripheries of the rings 65—65 as by machine screws 79—79 threaded in the rings 65—65 and having their heads recessed beneath the tops of said segments 77—77. The advance side of each segment 77 is uniformly curved downwardly to the level of the bottom of the space between the teeth 72—72 to support the cross wires in spaced relation with respect to the bottoms of the spaces between adjacent teeth 72—72 of the rings 71—71. The annular segments 77—77 form a bridge for the current between the two rows of roller electrodes for welding the line wires to the cross wires and may be made from a hard drawn copper or any other suitable material which may serve as a resistance welding electrode.

The spaces between the toothed rings 71—71 forming the circumferential slots 39—39 are sufficiently wide to allow the rolling electrodes 13—13 to extend therein and engage the line wires 10—10 and press said line wires into engagement with the cross wires 11—11. The electrodes 13—13 also serve to guide the line wires to pass partially around said drum and to bond said line wires to said cross wires by welding. The advance ring 67 has teeth 83—83 cut therein which converge toward a point at the advance or outer side of said ring, as may best be seen with reference to Figures 3 and 4. This provides diverging advance ends to the slots 37—37, enabling the cross wires to enter the slots 37—37 during rotation of the magazine 12. The bottoms of the spaces between the teeth 83—83 are likewise curved downwardly at the entering or advance ends thereof to deflect the line wires into the spaces between the teeth 83—83 and into the cross wire receiving slots 37—37.

A retaining means is provided to retain the cross wires 11—11 in the slots 37—37 prior to engagement thereof by the line wires 10—10. This retaining means is best shown in Figures 11, 12 and 13 and includes a plurality of spaced retaining fingers 84—84 secured to the horizontal leg of an angle 85 extending across and secured at its ends to the side frame members 23—23. The fingers 84—84 extend downwardly into and along the line wire receiving slots 39—39, and the under surface thereof is of an arcuate formation spaced outwardly from and conforming to the arc of the cross wire engaging surface of the magazine 12. Said fingers extend along the magazine from a substantially horizontal position, where the cross wires are fed to the slots 37—37 and downwardly along said magazine in parallel spaced relation with respect thereto to a position adjacent the line of contact of the line wires with the cross wires. The top surfaces of the fingers 84—84 are inclined in a plane substantially tangential to the arc which the inner or undersides of the line wires 10—10 assume when in engagement with the cross wires and wrap around the magazine 12 and guide the line wires from the line wire guide 36 to the circumferential slots 39—39.

*Cross wire measuring, shearing and feeding device*

Figure 3:
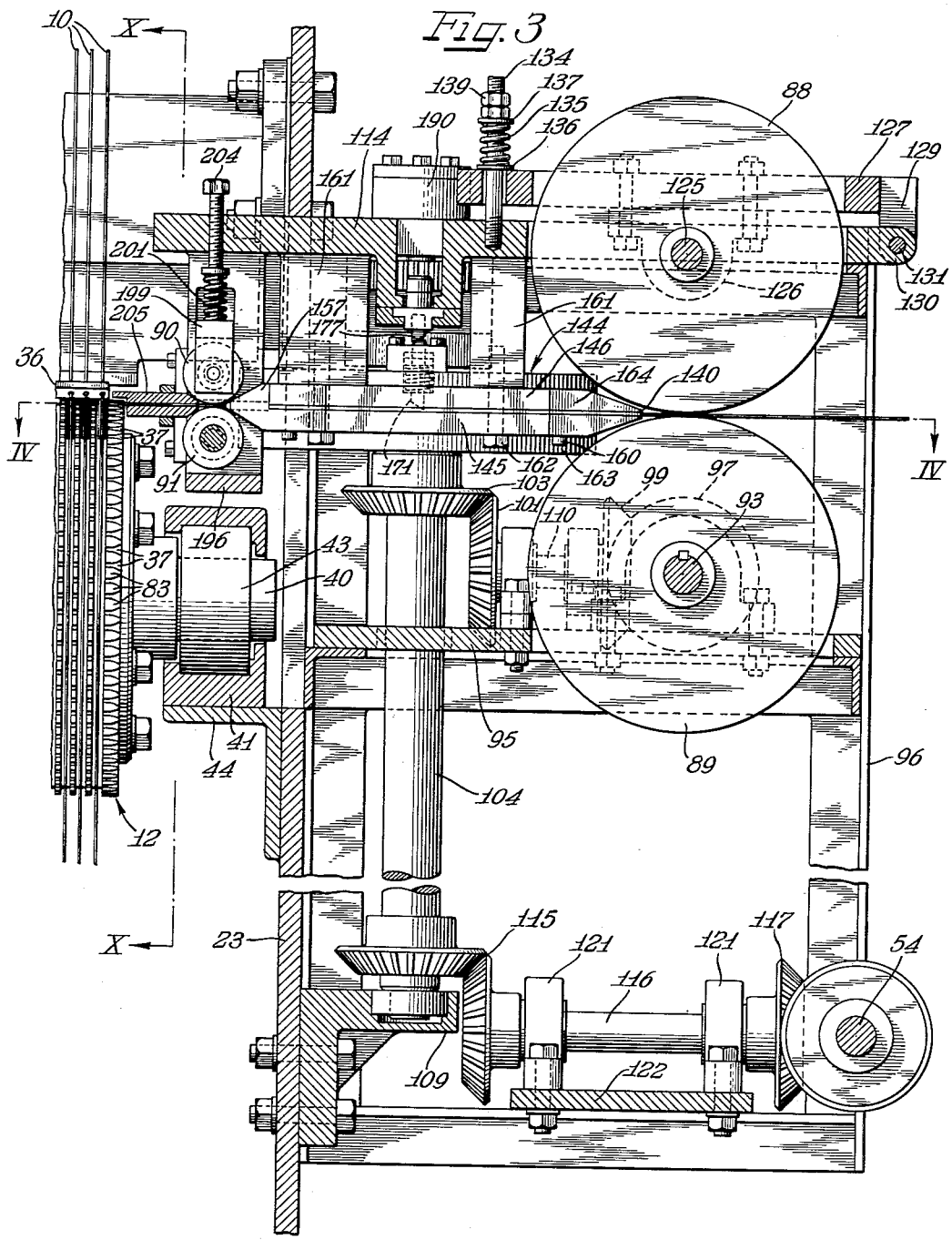
Figure 3 is an enlarged fragmentary transverse sectional view taken substantially along line III—III of Figure 2.

The means for measuring and cutting the cross wires from a continuous strand of wire and for feeding the cross wires into the cross wire receiving slots 37—37 during rotation of the magazine 12, without interruption of the rotation of said magazine or of the measuring, shearing and feeding operation, includes a flying shear 87. It also includes two pinch rolls 88 and 89 feeding the wire to said shear and two pinch rolls 90 and 91 at the discharge end of said shear and having a nip in alignment with the nip between the pinch rolls 88 and 89 (Figures 3 and 4).

The pinch roll 89 is keyed to a horizontal shaft 93 journaled on opposite sides of said roll in bearing supports 94—94 secured to and extending upwardly from a shelf-like structure 95. The shelf 95 extends outwardly from the right-hand frame member 23 and is suitably secured thereto at its inner end and is supported at its outer end on the vertical legs of a frame structure 96 secured to and extending outwardly from the right-hand frame member 23. A miter gear 97 is keyed on one end of the shaft 93 and is driven from a miter gear 99 on the outer end of a transverse shaft 100. A miter gear 101 on the inner end of the shaft 100 meshes with and is driven from a miter gear 103 keyed to a vertical shaft 104 and secured thereto by set screws 105—105 (Figures 3 and 6). The vertical shaft 104, besides driving the pinch rolls 88 and 89, also serves as a drive shaft for the flying shear 87 and is journaled at its lower end in a bearing support bracket 109 secured to and projecting outwardly from the outer side of the right-hand frame member 23. The shaft 104 is journaled adjacent its upper end above the flying shear 87 on a ball bearing 111 mounted in a bearing support member 113 secured to and depending from a top plate 114 of the frame structure 96 (Figure 6).

The vertical shaft 104 is driven from a pair of meshing miter gears 115—115, one of which is keyed on the lower end of the shaft 104 and the other of which is keyed on the inner end of a transverse shaft 116. The shaft 116 is driven from the opposite end of the shaft 54 from the miter gears 55—55 by means of a pair of meshing miter gears 117—117. The shaft 117 is journaled between the miter gears 115 and 117 on bearing support members 121—121 secured to and projecting upwardly from a plate 122 extending along the bottom of the frame structure 96 and forming a part thereof.

The upper pinch roll 88 is mounted on a longitudinally extending freely rotatable shaft 125. The shaft 125 is journaled on opposite sides of the pinch roll 88 in bearing supports 126—126 depending from a rocking member 127. The rocking member 127 is apertured at its center to permit the roll 88 to extend therethrough and has a depending outer end portion 129 pivotally secured between two spaced ears 130—130 projecting outwardly from the top plate 114 on a pivotal pin 131. The end of the rocking member 127 opposite the pivotal pin 131 has a threaded rod 134 extending therethrough with sufficient clearance to permit limited rocking movement of said rocking member. The rod 134 is threaded in the plate 114 and projects upwardly therefrom. A spring 135 encircles the upper portion of the rod 134 and is interposed between a washer 136 abutting the top of the rocking member 127 and a washer 137 held to said rod by lock nuts 139—139. The spring 135 urges the pinch roll 88 into engagement with the pinch roll 89 and the wire passing through the nip therebetween. The wire is fed by the pinch rolls 88 and 89 into an elongated guide 140, shown in Figure 5 as being rectangular in cross section and having an outwardly flared entering end. The guide 140 extends into a peripheral slot 143 formed in a rotatably driven disk 144 of the flying shear 87.

The disk 144 is keyed on the vertical shaft 104 just above the miter gear 103 and is rotatably driven therefrom. The elongated guide 140 is formed between two elongated plates 145 and 146 spaced apart by spacing members 147 and 149. The plates 145 and 146 extend from the nips between the pinch rolls 88 and 89 to the nips between the pinch rolls 90 and 91, and opposite ends thereof converge toward each other and enter into the nips between the pinch rolls 88 and 89 and the pinch rolls 90 and 91. The insides of said plates are also recessed to conform to the periphery of the disk 144 to receive said disk and allow the spacing members 147 and 149 to extend within the peripheral slot 143 of the disk 144. The spacing member 147 extends along the plate 145 for substantially the entire length thereof into the peripheral slot 143, and the inner side thereof forms a rectilinear guide for the wire as it enters and leaves the flying shear 87.

The spacing member 149 is spaced inwardly of the spacing member 147 at the entering end of the flying shear 87 and is located in position by means of locating pins 151—151. The inner side of the spacing member 149 forms an inner wall of the guide 140 in alignment with the periphery of the peripheral slot 143. The elongated guide 140 thus guides the strand of wire into the peripheral guide or slot 143 in a straight line path to the periphery of said slot and maintains the wire in engagement with the periphery of said slot for shearing.

The end of the spacing member 147 adjacent the pinch rolls 90 and 91 also forms one wall of a guide 153, guiding the strand of wire in a straight line path to the pinch rolls 90 and 91. A spacing member 154 is spaced inwardly of the spacing member 147 and is properly located with respect to the plate 145 by locating pins 155—155 and extends within the slot 143 and forms an inner wall of the guide 53, guiding the sheared wire in a rectilinear path as it is pulled from the flying shear 87. The entering end of the spacing member 155 is flared to readily guide the free end of the wire into the guide 153. The guide 153 terminates into a tube 156 mounted in an upwardly projecting end 157 of the lower plate 145. The tube 156 has an outwardly flared entering end and extends into the nip between the pinch rolls 90 and 91 to accurately guide the wire thereinto. The tube 156 is herein shown as being secured to the upwardly projecting end portion 157 of the plate 145 as by a set screw 159 (Figure 4).

The plates 145 and 146 are secured together by cap screws 160—160 threaded within the top plate 146. The plates 145 and 146 are secured to the lower ends of brackets 161—161 depending from the plate 114 by means of cap screws 162—162 extending through said plates and threaded in said brackets.

The rotary disk 144 is formed by two spaced disks 163 and 164 of substantially the same diameter and spaced apart by a disk 165 of a smaller diameter and partially recessed within the adjacent surfaces of the disks 163 and 164. The outer periphery of the disk 165 forms the wire engaging periphery of the peripheral slot 143, and said disk 165 spaces said disks 163 and 164 apart to form the slot 143.

The disks 163 and 165 have a rectangular recess or slot 169 formed therein. A back-up bar 170 for a cutter 171 is mounted in said recess to back up and be slidably engaged by the cutter 171 as it moves into the recess 169 to shear the wire. The cutter 171 is slidably mounted in the disk 164 and moves into the slot 169 during the shearing operation, as may best be seen with reference to Figure 8. The cutter 171 is encircled by a compression spring 173 interposed between the bottom of a recessed portion 174 of the disk 164 and a collar 175 spaced vertically from the bottom of said recessed portion and suitably secured to the cutter 171. The collar 175 is slidably guided within a downwardly facing cylindrical recess formed in a cap member 176 secured to the top of the disk 164 in alignment with the recess 174.

The cutter 171 extends upwardly through the top of the cap member 176 and has an upper curved surface curving downwardly in the direction of rotation of the cutter which is engaged by an oppositely inclined surface of a depending cam member 177 during certain revolutions of said cutter. The cam member 177 is secured to and depends from a block 179 guided for radial movement of the disk 144 in guides formed by spaced shouldered strips 180—180 engaging corresponding shouldered portions of the block 179 and forming a slidable supporting guide therefor. The guide strips 180—180 are secured to and depend from the bottoms of depending support legs 181—181, herein shown as being formed integrally with the plate 114 and as depending therefrom.

It is obvious from the foregoing that upon rotation of the disk 144 in one direction and engagement of the downwardly curved top surface of the cutter 171 with the inclined surface of the depending cam 177, the cutter 171 will move downwardly into the slot 169 against the compression spring 173 and along the back-up bar 170 and shear the wire traveling from the pinch rolls 88 and 89 to the pinch rolls 90 and 91 along the peripheral slot 143.

In order that the strand of wire may be measured and cut to the proper length, the cam 177 is only moved into position to engage the cutter 171 during certain revolutions of the disk 144. For measuring and cutting wires of a length substantially equal to the width of the magazine 12, the cam 177 is moved into position to be engaged by and to depress the cutter 171 during each third revolution of the disk 144. The block 179 and cam 180 are moved radially of the disk 144 in a predetermined timed relation with respect to rotation of said disk by a connecting link 183 journaled at one of its ends on a pin 184 threaded within the block 179 and projecting upwardly therefrom (Figures 6 and 7). The opposite end of the link 183 is journaled on a pin 185 depending from a spur gear 186 and threaded therein eccentric of the center thereof. The pin 185 thus forms a crank for reciprocably moving the block 179 along the gibbed guides 180—180 upon rotation of the spur gear 186.

The spur gear 186 is herein shown as having a shaft 187 formed integrally therewith and extending upwardly therefrom. The shaft 187 is journaled in the top plate 114 on a ball bearing 188 mounted in the lower end of said plate. The upper end of the shaft 187 is journaled in a ball bearing 189 mounted in a bearing support 190 secured to and extending upwardly from the top of the plate 114.

The spur gear 186 is meshed with and driven from a spur pinion 191 keyed on the upper end of the vertical shaft 104. The reduction between the spur pinion 91 and the spur gear 86 is such that the block 179 and cam 177 will move from the position shown in Figure 6 to the extreme outer end of the gibbed guides 180—180 and back into position to engage and depress the cutter 171 during each third revolution of the shaft 104 and the rotary disk 144. The traveling strand of wire is thus cut into a cross wire of the desired length each third revolution of the disk 144. It will of course be understood that the geared reduction between the shaft 104 and the crank formed by the pin 185 may be varied according to the desired length of the cross wires to be cut. The lower roll 91 with the upper pinch roll 90 accelerates the severed cross wire and feeds it into a moving slot 37 of the magazine 12. Said lower pinch roll is driven from an individual motor 193 at a higher peripheral speed than the peripheral speed of the pinch roll 89 through a coupling 194, directly coupling the shaft of said motor with an aligned shaft 195 having the pinch roll 91 secured thereto. The shaft 195 is journaled on opposite sides of said pinch roll in a yoke 196 on ball bearings 197—197.

The upper pinch roll 90 is journaled in a slotted block 199 on a shaft 200 and extends within the slotted portion of said block. The block 199 is slidably guided between the sides of the yoke 196 and is urged to yieldably engage the pinch roll 90 with the pinch roll 91 by means of a compression spring 201. The compression spring 201 is seated at its lower end on a stud 202 projecting upwardly from the block 199 and is seated at its upper end on a seating member 203 rotatably mounted on the lower end of a machine screw 204. The machine screw 204 is threaded in the top plate 114 and extends therethrough into the guide for the block 199 (see Figures 8 and 9).

A rectilinear guide 205 leads from the nip between the pinch rolls 90 and 91 to the teeth 83—83 of the advance ring 67 of the magazine 12 for guiding the cross wires to the spaces between said teeth during rotation of said magazine (Figures 4 and 11). The guide 205 is shown as being closed on three of its sides and open on the fourth side, that is, the side in the direction of travel of the magazine 12, to allow for lateral movement of the cross wire as it enters its cross wire receiving slot 37 as the magazine 12 is continuously rotating, as may clearly be seen with reference to Figure 4.

When initially setting up the machine, a strand of wire is trained between the pinch rolls 88 and 89 and into the guide 140 by hand. The machine is then started in operation and the first cross wire is usually discarded. The next succeeding cross wires, however, will all be measured and cut to the proper length by the flying shear 87 during travel of the wire along the periphery of the peripheral slot 143. After the wire has been sheared, the leading end of the next adjacent cross wire follows the trailing end of the preceding cross wire into the guide 153 and tube 156 in the space between the pinch rolls 90 and 91. The pinch roll 91 being driven at a higher peripheral speed than the pinch roll 89, and thus at a greater speed than the speed of travel of the wire to the flying shear 87, will slip on the unsevered cross wire until the severing thereof by the flying shear 87. This slipping of the lower pinch roll 91 on the unsevered wire will maintain the wire under tension, and immediately the wire is severed the pinch rolls 90 and 91 will accelerate the severed cross wire and rapidly thrust it in an endwise direction between the tapered teeth 83—83 at the entering end of the rotating magazine 12 into a cross wire receiving slot 37 and along said slot into engagement with the retaining member 61 at the far end of said slot. While the trailing end of the severed cross wire will bend slightly as it leaves the pinch rolls 90 and 91, due to rotational travel of the magazine, the acceleration of the wire is great enough that it will freely pass in the slot 37, the bent portion of the wire springing back to shape as soon as it leaves the pinch rolls. As one cross wire leaves the pinch rolls 90 and 91, the leading end of the next succeeding cross wire enters the nip between said rolls and is fed thereby and accelerated when severed to pass into the next succeeding cross wire receiving slot 37. As each cross wire 10 is fed into its cross wire receiving slot in a substantially horizontal position, it is retained within its slot by the retaining fingers 84—84 until in position to be engaged by the line wires 10—10 as shown in Figure 12.

*Rolling Electrodes and apparatus for welding line wires to cross wires*

The rolling electrodes 13—13 are arranged in staggered relation with respect to each other so that alternate electrodes are in advance of the others and engage and weld alternate line wires to the respective cross wires. The alternate or lower electrodes 13—13 are of the same construction as the upper electrodes 13—13, so only the upper electrodes need herein be shown and described in detail and the same reference numbers will be applied to all of said electrodes.

Each electrode 13 is herein shown as being in the form of a roller having a grooved periphery 207 engaging the respective line wire (Figures 15 and 16). A hub 209 projects from each side of the roller 13 and is herein shown as having a shaft 210 extending from opposite sides thereof. The electrodes 13—13 may be made from a hard drawn copper, a material known to the trade as "Malory" metal, or any other suitable conductor for resistance welding.

The shaft 210 is rotatably mounted on two parallel spaced arms 211—211 extending along opposite sides of the hub 209 and the electrode 13. The arms 211—211 are pivotally mounted at their rear ends on a support leg 212 secured to a bracket 213, as by machine screws, and extending therefrom toward the magazine 12 (Figures 10 and 12). The bracket 213 is in turn secured to a downwardly facing inclined face 215 of a box-like beam 216.

The beam 216 is flanged at its opposite ends and is secured to opposite frame members 23—23 as by nuts and bolts 217—217 extending through the flanged portion of said beam. As shown in Figure 15, a sheet of insulating material 219 is interposed between each flanged end of the beam 216 and the respective side frame 23 to insulate said beam from the machine frame. The bolts 217 are also insulated from said beam by means of flanged sleeves 220—220 mounted in the bolt-receiving apertures of the flanges of the beam 216 with the flanged portions of said sleeves extending along the inner sides of the flanges of the beam 216 and abutting the heads of the bolts.

The bracket 213 is sufficiently long to support all of the upper electrodes 13 and has a lower shelf 221 extending therefrom in a downwardly inclined direction to which is bolted a rearwardly extending leg 223 of a guide member 224 (Figures 12 and 15). The guide member 224, as herein shown, extends along the shelf 221 for substantially the entire length thereof and is provided with a plurality of spaced guide slots 225—225 for conductors 227—227. The guide slots 225—225 extend entirely through the guide members 224 and open to opposite ends thereof in a direction substantially normal to the peripheral surface of the magazine 12. A conductor 227 having a lower bifurcated end portion extending along opposite sides of the electrode 13 is slidably mounted in each guide slot 225. The lower ends of each conductor 225 are concave and conform to and engage the hub 209 on opposite sides of the electrode 13. A compression spring 229 is provided for each conductor 227 to yieldably engage the associated electrode 13 with its line wire.

The conductors 227 may be in the form of brushes and may be made from one of the various forms of carbon brush materials, but are herein shown as being made from a suitable conducting metal which may be a hard drawn copper. A shunt 230 is secured at one of its ends to the top or outer side of the conductor 227, as by machine screws 231—231. The shunt 230 is connected at its opposite end to a transformer 233 through a connector indicated generally by reference character 234. The shunts for the upper electrodes are insulated from the shunts for the lower electrodes by means of an insulating plate 235 extending therebetween and spacing said shunts apart (Figures 10 and 12).

The compression spring 229 is seated at its lower end on a seating member 237 mounted on the machine screws 231—231. Said spring is seated at its opposite end on a seating member 239 rotatably mounted on the lower end of an adjusting screw 240. The adjusting screw 240 is threaded within a shelf 241 extending from the upper end of bracket member 213 in parallel relation with respect to the shelf 221. A lock nut 243 is provided to lock the screw 240 from movement when the spring 229 is adjusted to the proper tension.

The alternate lower rolling electrodes 13—13 are mounted on the upper face of a box-like beam 244 spaced angularly downwardly from the box-like beam 216 and are insulated from the side frame members 23—23 in the same manner the beam 216 is insulated therefrom. The beam 244 is like the beam 216 and the lower electrodes 13 are connected to and supported thereon in the same manner as the upper electrodes 13 are connected to and supported on the beam 216, except that the lower electrodes are connected to an upper face of the beam 244 and are spaced upwardly therefrom instead of to a lower face, as are the upper electrodes.

The supply of current to the upper and lower electrodes 13—13 may be controlled by a suitable control means, either operated manually or automatically by operation of the machine which may include a timer and a master controller (not shown). Said control means and the specific manner of welding may be of various forms and comprise no part of my present invention, so are not herein shown or described in detail. Since each transformer is connected with an upper and a lower electrode, the upper electrodes 13—13 may weld alternate line wires to the cross wires as indicated by reference characters 245—245 in Figure 16. The lower rolling electrodes 13—13 may at the same time weld the line wires 10—10 intermediate the line wires welded by the upper electrodes to said cross wires 11 as indicated by reference character 246 in Figure 16. During this welding operation, the weld segments 77—77 on the magazine 12 may serve as a bridge for the current between the two rows of upper and lower roller electrodes and through the weld points 245—246.

Summary of welding operation

When setting up the machine to start the welding operation, the individual line wires 10—10 may be trained through the apertures 35—35 in the guide 34 and over the roller 26 and downwardly therefrom and through the apertures in the guide 36 into the circumferential slots 39—39 into engagement with the grooves 207—207 of the electrodes 13—13, said electrodes holding the line wires partially wrapped around the magazine 12 as shown in Figure 10. At this time, rotation of the magazine 12 may be started, and the measured and sheared cross wires may be fed thereto by the rapidly rotating pinch rolls 90 and 91. The line wires 10—10, however, will slip on the magazine 12 in the circumferential line wire slots 39—39 and will not start to travel until the cross wires are welded thereto. The cross wires are advanced until certain cross wires are in engagement with the line wires under both the upper and the lower rolling electrodes 13—13. At this time a timing device (not shown) may start the welding current to flow, to weld the line wires to the cross wires. Due to the fact that certain cross wires have advanced beyond the upper electrodes, the first six cross wires will only be welded to half the line wires. This part of the mat may be discarded. As soon as the first six cross wires are welded, the teeth of the rotating magazine engaging the welded cross wires will advance all of the line wires. From this time on, the magazine 12 will feed the line wires and cross wires as a unit and the mesh fabric will move downwardly from the magazine 12 to position to engage laterally and circumferentially spaced and aligned teeth 247—247 of the tailing or drawing drum 15. The drum 15 rotates at the same peripheral speed as the magazine 12 and draws the welded mesh from said magazine. From the drum 15 the mesh may be trained in an upwardly inclined direction over the idler 16 through the shear 17. When the mesh is so trained, the feeding thereof may be continuous with no attention from the operator.

Tailing drum

The tailing drum 15, as best shown in Figures 17, 18 and 19, includes a drum or cylinder 248 secured to spaced annular webs 249—249 secured to the shaft 50, as by welding. A plurality of abutting annular ring sections 250—250 having the circumferentially and transversely spaced teeth 247—247 extending from the periphery thereof are mounted on the drum 248 and are keyed thereto to rotate therewith. Retaining rings 251—251 security to opposite ends of the drum 248, as by cap screws 252—252, engage the outer ends of the outer rings 251—251 and hold said rings in abutting relation with respect to each other and to the drum 248.

A means is provided to permit adjustment of the drum 15 to bring the teeth 247—247 into mesh with the cross bars 11—11 when initially setting up the machine. As shown in Figures 17, 20 and 21, a flanged hub 253 is keyed to the opposite end of the shaft 50 from the gear 57. The flanged portion of the hub 253 abuts the outer face of the spur gear 49 which is freely mounted on the shaft 50. The flanged portion of the hub 253 is provided with a plurality of elongated arcuate slots 254—254 extending therethrough and through which extend studs 255—255 threaded in the spur gear 49. Nuts 256—256 threaded on the outer ends of the studs 255—255 are provided to lock the hub 253 to rotate the gear 49 upon rotation of the shaft 50 when the drum 15 is so adjusted that the teeth 247—247 thereof uniformly engage the cross wires 11—11. After initially setting up the machine for a particular size mesh, it should not be necessary to readjust the drum 15 and, if desired, the hub 253 and gear 49 may also be locked together by a suitable locking pin (not shown) extending through registering drilled portions of said flange and gear, or by any other suitable semi-permanent locking means.

Trimming, slitting and baling

The slitter 17 is arranged to trim the edges of the mesh fabric and to slit the fabric longitudinally into two pieces of the desired width and is no part of my present invention, so need not herein be shown or described in detail. Said trimmer may consist of outer rotating trimming knives (not shown) which will trim the edges of the fabric and two centrally disposed trimming knives (not shown) arranged to sever the fabric into two relatively wide sections of the desired width, leaving a narrow intermediate section therebetween which may be scrapped (Figure 1). It is, of course, obvious that the slitter 17 need not be used where mesh of the width of the magazine 12 is desired. The knives of the trimmer 17 may be driven from the motor 21 through a speed reducer 261 of a well known form and a chain and sprocket drive 262.

The baler or coiler 20 need only be described in sufficient detail to make my present invention readily understandable, since the details thereof form no part of my present invention. Said baler includes generally a split coiling block 273 releasably mounted on the inner ends of aligned transverse shafts 264 and 265 journaled in frame structures 266 and 267 for the baler. The halves of the baling block 263 have a slot 268 formed therebetween to receive and grip the leading end of the mesh and coil or bale the mesh upon rotation of said block. When the bale is of the desired diameter, the mesh fabric may be sheared transversely thereof by hand, or by machine if desired. A hand lever 269, operable to release the block 263 from the ends of the shafts 264 and 265, may then be moved into position to release the block 263 and allow it to drop to the ground or onto a suitable rack or container with the mesh coiled thereon. The block 263 will collapse when released and may then be removed from the bale. The block 263 may then be mounted between the inner ends of the shafts 264 and 265 to coil the next bale of mesh, or spare blocks may be provided to avoid delays which may be occasioned when removing the block from the baled mesh.

The block 263 may be driven from its opposite ends by the motor 21 and speed reducer 261 by means of a chain and sprocket drive 270 driving a countershaft 271 through a clutch 272. Chain and sprocket drives 273 and 274 driven from opposite ends of the countershaft 271 drive the respective shafts 264 and 265 at the same rates of speed.

Fine mesh fabricating machine

Figure 24:
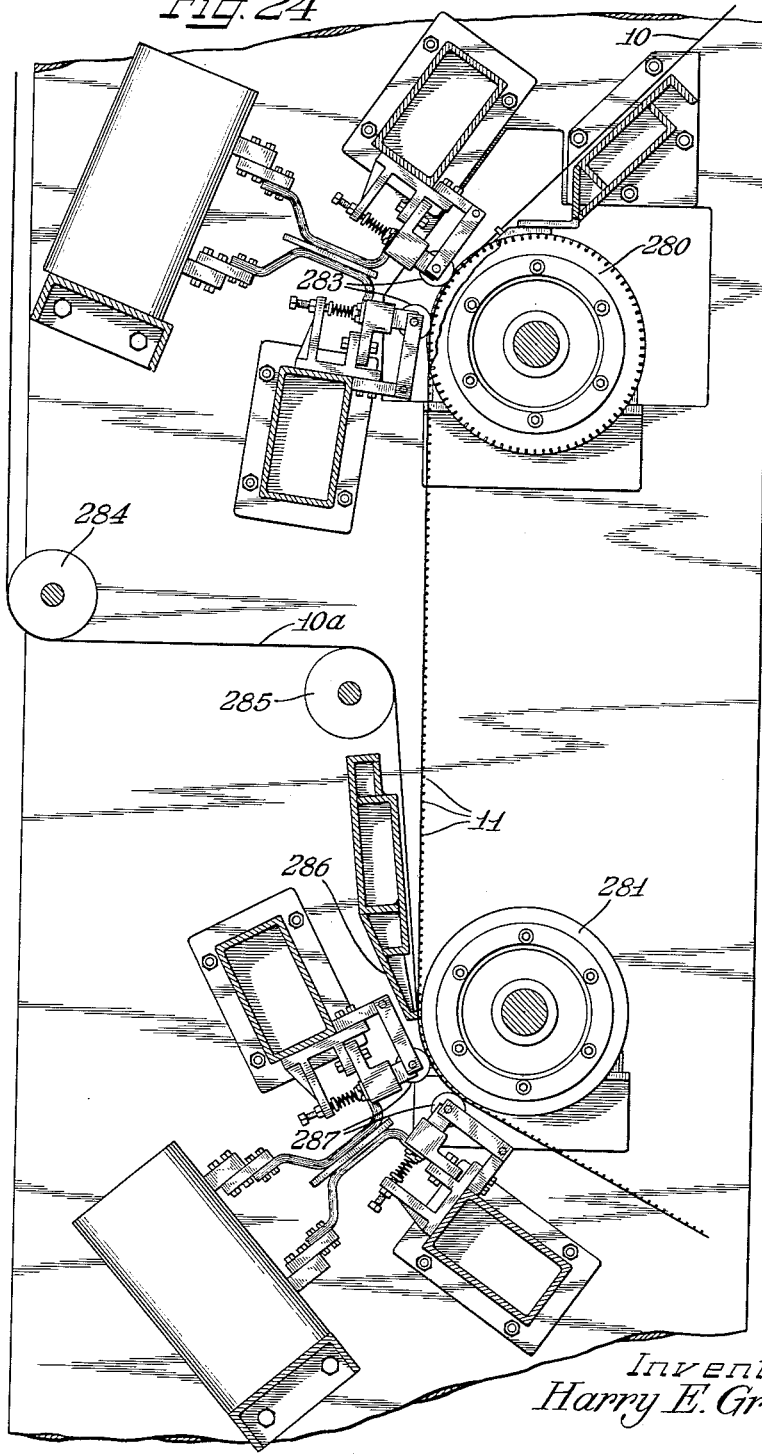
Figure 24 is a fragmentary view in side elevation with certain parts broken away and certain other parts shown in section in order to show a modified form in which my invention may be embodied.

In Figures 24, 25 and 26 I show a modified form in which my invention may be embodied. The machine shown in these figures is particularly adapted to make a finer mesh than could be made by the machine shown in Figures 1 through 23. In this form of my invention the line wires 10—10 are measured, cut and supplied to a rotating magazine 280 in the same manner they are supplied to the magazine 12. The magazine 280 is much like the magazine 12, except the cross wire receiving slots are spaced closer together than in the magazine 12 to more closely space the cross wires for welding to the line wires. A drum 281 is shown as being spaced beneath the magazine 280 and serves as a rotating electrode for welding a second set of line wires 10a guided between the line wires 10 to the cross wires 11—11 as shown in Figure 26. The magazine 280 and the drum 281 are herein shown as being of the same diameter and may be driven from a single motor (not shown) at the same peripheral speeds, in much the same manner the magazine 12 and tailing drum 15 are driven at the same peripheral speeds.

A plurality of rolling electrodes 283—283, like the rolling electrodes 13—13, are spaced across the magazine 280 and extend within the respective line wire receiving slots (not shown), alternate electrodes being spaced in advance of the others. Alternate line wires are thus first welded to the cross wires and then the intermediate line wires are welded to the cross wires in the same manner as in the machine shown in Figures 1 through 23, so are not herein described in detail.

It should here be noted, however, with reference to Figure 25, that as the welded mesh leaves the magazine 280 the pattern thereof is an oblong form with the cross wires spaced relatively close together and the line wires spaced further apart, equal distances from each other.

The second series of line wires 10a—10a is shown in Figure 24 as being trained under an idler drum 284 laterally of the machine frame toward the center thereof over an idler drum 285 and downwardly therefrom toward the drum 281 so as to engage the cross wires substantially tangentially of said drum. The line wires 10a—10a are guided between the line wires 10—10 under a guide member 286 in slotted portions thereof (not shown) opening toward the drum 281. From thence the line wires 10a—10a are engaged by alternately arranged rolling electrodes 287—287, like the electrodes 283—283 and 13—13, and are pressed into engagement with the cross wires by said electrodes and alternately welded thereto, it being understood that the drum 281 forms a bridge for the current between the upper and lower rows of roller electrodes.

The drum 281 may be like the magazine 280, without the line wire receiving slots formed therein, and while said drum may be slotted to mesh with the cross wires 11—11 and thus draw the partially welded mesh from the magazine 280, the drum 281 need not be slotted. Return electrodes (not shown), like the electrodes 77—77, may be secured to the face of said drum in the same laterally spaced relation with respect to each other as the line wires 10a—10a.

It should here be noted with reference to Figure 26 that the upper rolling electrodes 287—287 weld every other line wire 10a to a common cross wire, as indicated by reference character 290. The lower electrodes 287—287 then weld the intermediate line wires 10a to a common cross wire as indicated by reference character 291.

When the completed mesh leaves the drum 281, it may be trained around a suitable tailing drum (not shown), like the tailing drum 15, and from there may be trimmed and slit longitudinally when desired and may then be baled in the same manner as in the form of my invention shown in Figures 1 and 2.

It may be seen from the foregoing that the modified form of my invention just described provides a simplified means for adapting the machine shown in Figures 1 through 23 to the welding of a much finer mesh fabric than could be made on the machine shown in Figures 1 through 23 by simply providing a second welding drum and series of rolling electrodes and training a second series of line wires between the line wires already welded to the mesh and alternately welding the line wires to the cross wires in the proper spaced relation with respect to each other.

It will be understood that modifications and variations may be effected without departing from the spirit and the scope of the novel concepts of the present invention.

I claim as my invention:

1. In a wire mesh fabricating machine, a frame, a cross wire magazine journaled thereon including a drum transversely slotted to receive a plurality of cross wires from the ends of said slots and to supply said cross wires for engagement with and welding to line wires in uniform spaced relation, said drum also being circumferentially slotted entirely around the periphery thereof, the circumferential slotted portions thereof intersecting the transverse slotted portions thereof, a second drum journaled in said frame in spaced relation with respect to said first drum and having a plurality of individual transversely spaced aligned teeth extending around the circumference thereof, a motor on said frame, a positive drive connection from said motor to drive both of said drums at the same peripheral speed, a cross wire feeding and guide means leading to said transverse slotted portion of said first drum and including two pinch rolls and means for rotatably driving said pinch rolls at a predetermined speed for feeding the cross wires to said transverse slotted portion during rotation of said magazine, means for guiding a plurality of line wires into the circumferentially slotted portion of said magazine and into engagement with said cross wires including a plurality of rolling electrodes pressing said line wires into engagement with said cross wires and bonding said wires by welding, and the teeth of said second drum engaging the welded cross wires and drawing said line wires from said magazine at the speed of travel thereof.

2. In a machine for fabricating welded wire mesh consisting of a plurality of uniformly spaced cross wires having a plurality of parallel spaced line wires secured thereto, a motor, a drum rotatably driven by said motor and comprising a cross wire magazine continuously driven by said motor and supplying cross wires to the line wires and having a plurality of uniformly spaced cross wire receiving slots opening to the periphery thereof and to one end thereof, means measuring a continuously moving strand of wire and severing the wire into cross wires of predetermined uniform lengths, and means aligned with the path of travel of the wire through said measuring and severing means for feeding the severed cross wires endwise into said slots through the open ends thereof, during travel of said magazine, including two pinch rolls, means driving said rolls at a predetermined speed of rotation, and cross wire guide means interposed between said pinch rolls and magazine and facing the open ends of said slots.

3. In a machine for fabricating welded wire mesh consisting of a plurality of uniformly spaced cross wires having a plurality of parallel spaced line wires secured thereto, a cross wire magazine, a motor, and means driven by said motor for rotatably driving said magazine to continuously supply cross wires to the line wires, said magazine including a rotatably driven drum having a plurality of uniformly spaced cross wire receiving slots extending transversely thereof and opening to the periphery thereof and to one end thereof and also having a plurality of circumferential line wire receiving slots intersecting said cross wire receiving slots, and means for continuously feeding cross wires of uniform length to said slots through the open ends thereof and into engagement with the closed ends thereof including two engaging pinch rolls having a nip through which the wire passes at the point of engagement therewith, means guiding the cross wires to the nip between said rolls, means driving one of said pinch rolls at a predetermined speed of rotation, and guide means from the nip between said pinch rolls to the open ends of said slots including a guide member having a cross wire guiding apertured portion extending therethrough in alignment with said slots and the nip between said pinch rolls, the apertured portion of which is closed on three sides thereof and open on the fourth side thereof in the direction of travel of said magazine.

4. In a machine for fabricating welded wire mesh consisting of a plurality of uniformly spaced cross wires having a plurality of parallel spaced line wires welded thereto, a continuously moving cross wire magazine supplying cross wires to the line wires and including a rotatably driven drum having a plurality of uniformly spaced cross wire receiving slots extending transversely thereof and opening to the periphery thereof and to one end thereof and also having a plurality of circumferential line wire receiving slots intersecting said cross wire receiving slots, and means for continuously feeding cross wires of uniform length to said slots through the open ends thereof and into engagement with the closed ends thereof including two pinch rolls having a nip through which the wire passes at the point of engagement therewith, means guiding the cross wires to the nip between said rolls, means driving one of said pinch rolls at a predetermined speed of rotation, guide means from the nip between said pinch rolls to the open ends of said slots, means guiding the line wires to pass partially around said drum in said circumferential slots, a plurality of cross wire retaining fingers extending into said circumferential slots for a portion of the depth thereof and extending therealong from the region of said guide means to points adjacent said line wires as they enter said circumferential slots, and said guide means for said line wires also including a plurality of rolling electrodes pressing said line wires into engagement with said cross wires and bonding said wires by welding.

5. In a machine for fabricating welded wire mesh consisting of a plurality of uniformly spaced cross wires having a plurality of parallel spaced line wires secured thereto, a cross wire magazine, a motor, a drive connection from said motor to said magazine for continuously driving said magazine to supply cross wires to the line wires, said magazine including a drum having a plurality of uniformly spaced cross wire receiving slots extending transversely thereof and opening to the periphery thereof and to one end thereof and also having a plurality of circumferential line wire receiving slots intersecting said cross wire receiving slots, feed means for a continuous strand of wire including two pinch rolls, means for driving said pinch rolls by power, shearing means in advance of said feed means and operative to measure and periodically cut the moving strand of wire into cross wires of uniform length, two pinch rolls in advance of said shearing means, power means driving one of said advance pinch rolls at a higher peripheral speed than the peripheral speed of said first mentioned pinch rolls and guide means from said pinch rolls to the open ends of said slots, guiding said cross wires to enter successive of said slots during rotation of said magazine.

6. In an apparatus of the class described, means for measuring and shearing wires of uniform length from a continuous strand of wire, two pinch rolls engaging and feeding the wire for measuring and shearing and having a nip through which the wire passes at the point of engagement therewith, a rotary disk in advance of said pinch rolls and having a wire guide recessed within the periphery thereof in alignment with the nip between said pinch rolls, rectilinear guide means from said pinch rolls extending within said recessed guide and guiding wire to the periphery thereof, a cutter slidably mounted in said disk for movement in the direction of the axis of rotation thereof, and moving into said wire guide, a cutter engaging cam mounted for movement radially of said disk into position to be engaged by said rotating cutter to effect shearing movement of said cutter into said wire guide at predetermined periods during rotation of said disk, means driving said disk at a predetermined speed of rotation, and reduction gearing driven by said means driving said disk and operatively connected with said cam to reciprocably move said cam radially of said disk into position to be engaged by said cutter at predetermined periods in the cycles of rotation thereof.

7. In an apparatus of the class described, means for measuring and shearing from a continuously moving wire, wires of uniform length, two pinch rolls engaging and feeding the wire for measuring and shearing, a rotary disk in advance of said pinch rolls and journaled for rotation about an axis perpendicular to the axis of rotation of said pinch rolls and having a wire guide recessed within the periphery thereof in alignment with the nip between said pinch rolls, the recessed periphery of which forms a wire guiding and engaging member, power means for driving said pinch rolls at a predetermined speed of rotation, power means for driving said disk and the recessed peripheral wire engaging portion of said disk at the same peripheral speed as the peripheral speed of said pinch rolls, a shearing cutter slidably mounted on said disk for movement in a direction parallel to the axis of rotation thereof into and out of said wire guide, a rectilinearly movable cutter engaging cam, and a positive drive from said power means for rotatably driving said disk to said cam for rectilinearly moving said cam into position to be engaged by said cutter at predetermined periods during rotation thereof to effect shearing movement of said cutter.

8. In an apparatus of the class described, means for measuring and shearing from a continuously moving wire, wires of uniform length, two pinch rolls engaging and feeding the wire for measuring and shearing, a rotary disk in advance of said pinch rolls and journaled for rotation about an axis perpendicular to the axis of rotation of said pinch rolls and having a wire guide recessed within the periphery thereof in alignment with the nip between said pinch rolls, the recessed periphery of which forms a wire guiding and engaging member, power means for driving said pinch rolls at a predetermined speed of rotation, power means for driving said disk and the recesesd peripheral wire engaging portion of said disk at the same peripheral speed as the peripheral speed of said pinch rolls, a shearing cutter slidably mounted on said disk for movement in a direction parallel to the axis of rotation thereof into and out of said wire guide, a rectilinearly movable cutter engaging cam, a positive drive from said power means for rotatably driving said disk to said cam for rectilinearly moving said cam into position to be engaged by said cutter at predetermined periods during rotation thereof to effect shearing movement of said cutter, guide means entering said wire guide and guiding the wire to the wire engaging periphery thereof, a second set of pinch rolls at the discharge end of said disk and engaging the wire passing therefrom, and means driving said second set of pinch rolls at a higher peripheral speed than said first set of pinch rolls, to maintain tension on the wire prior to severing and to accelerate the severed wire.

9. In a machine for fabricating wire mesh consisting of a plurality of uniformly spaced cross wires with a plurality of parallel spaced line wires welded thereto, the improvement comprising a continuously rotating cross wire magazine having a plurality of uniformly spaced cross wire receiving slots opening to the periphery thereof and to one end thereof, the open end of each of said slots being of an outwardly flared formation to receive a line wire traveling transversely of said drum during rotation of said drum, and said drum also having a plurality of parallel spaced circumferential line wire receiving slots intersecting said cross wire receiving slots, the bottoms of said circumferential line wire receiving slots comprising segmental inserts secured to said drum in said line wire receiving slots and of an electrical conducting material different from the material of said drum and cross and line wires, and a plurality of staggered rollers yieldably engaging said line wires and pressing said line wires into engagement with said cross wires and said cross wires into engagement with said segmental inserts and forming rolling electrodes to bond said wires by welding.

10. In a welded wire mesh fabricating machine, a frame, a magazine journaled on said frame for rotation about a horizontal axis and having a cylindrical periphery with a plurality of transverse cross-wire carrying slots extending thereacross and opening to one end thereof, and a plurality of circumferential line wire slots intersecting the cross-wire carrying slots, a motor on said frame, means driven by said motor for continuously driving said drum, other means on said frame in alignment with said slots for continuously measuring and feeding cross-wires to said magazine including a pair of engaging pinch rolls having nips through which the wire passes in alignment with said slots and power means for driving said pinch rolls, means guiding a plurality of line wires to pass tangentially into said circumferential line wire slots over the cross-wires in the cross-wire slots, and a plurality of rolling electrodes mounted on said frame for centering said line wires with respect to said slots and yieldably pressing said line wires into engagement with said cross-wires and bonding said wires by welding.

11. In a welded wire mesh fabricating machine, a frame, a cross-wire magazine journaled on said frame for rotation about a horizontal axis and having a cylindrical periphery with a plurality of uniformly spaced cross-wire slots extending thereacross and opening to the periphery and one end thereof, and also having a plurality of line wire slots extending circumferentially thereof and intersecting said cross-wire receiving slots, means on said frame for continuously supplying cross-wires to said cross-wire receiving slots during rotation of said magazine comprising a pair of pinch rolls yieldably pressed into engagement with each other and having nips through which the wire passes in alignment with, and facing the open ends of said slots, guide means interposed between said pinch rolls and magazine for successively guiding a plurality of line wires endwise into said slots, means for guiding a plurality of line wires to pass over cross-wires in said wire slots, tangentially of the periphery thereof into said circumferential line wire slots, and a plurality of rolling electrodes yieldably mounted on said frame to yieldably engage said line wires and press said line wires into engagement with said cross-wires and bond said wires by welding.

12. In a welded wire mesh fabricating machine, a frame, a rotatable cross-wire magazine journaled on said frame for rotation about a horizontal axis and having a cylindrical periphery with a plurality of transverse cross-wire slots opening to the periphery and one end thereof and a plurality of circumferential line wire slots intersecting said cross-wire slots, a motor on said frame, means driven by said motor for continuously driving said drum, means guiding a plurality of line wires to said line wire slots tangentially of the bases thereof, other means on said frame to one side of said drum for continuously measuring and feeding cross-wires endwise into said slots through the open ends thereof, a plurality of rollers mounted on said frame for radial movement into said slots into engagement with the line wires therein, and spring means pressing said rollers into engagement with said line wires for centering said line wires with respect to said slots and maintaining said line wires into engagement with said cross-wires, for bonding the same by welding.

13. In an apparatus of the class described, a frame means on said frame for measuring and shearing wires of uniform length from a continuous strand of moving wire including two pinch rolls journaled on said frame for rotation about parallel axis, a motor on said frame, means driven by said motor for driving one of said pinch rolls, a rotary disc journaled on said frame in advance of said pinch rolls and having a wire groove recessed in the periphery thereof having a base in alignment with the point of engagement of said pinch rolls, a shearing cutter slidably mounted on said disc for rotation therewith and for movement into and out of said groove, means biasing said cutter out of said groove, means driven by said motor for driving said disc at such a speed that the base of said groove travels at the peripheral speed of said pinch rolls, a member slidably mounted on said frame for movement into position to be engaged by said shearing cutter and move the same by engagement therewith into said groove into a shearing engagement with the wire therein during rotation of said disc, and means driven by the means for driving said disc for moving said member into and out of position to be engaged by said cutter.

14. In an apparatus of the class described, a frame, means for measuring and shearing wires to uniform lengths from a continuous strand of wire including two pinch rolls journaled on said frame for rotation about parallel axis, means yieldably pressing one of said rolls into engagement with the other for engaging and feeding the wire, for measuring and shearing, a disc rotatably journaled in said frame in advance of said pinch rolls and having a wire guide groove recessed within the periphery thereof, the base of which groove is in alignment with the point of engagement of said pinch rolls, a shearing cutter slidably mounted on said disc for rotation therewith and for movement in the direction of the axis thereof into and out of said groove, means driven by said motor for rotatably driving said disc, a cutter engaging cam mounted in spaced relation with respect to said disc for movement from a position out of registry with said cutter, into a position to register with and be engaged by said cutter, to move said cutter within said groove, and means driven by the means for driving said disc for moving said cam into and out of registry with said cutter.

15. In an apparatus of the class described, a frame, means for measuring and shearing wires to uniform lengths from a continuous strand of traveling wire including two pinch rolls journaled on said frame, a motor on said frame, means driven by said motor for driving one of said rolls, other means yieldably engaging said rolls with each other, a rotary disc journaled on said frame in advance of said pinch rolls and having a wire guide groove recessed within the periphery thereof having a base in substantial alignment with the point of engagement of said pinch rolls, with each other, means guiding the wire from said pinch rolls into engagement with the base of said groove, a shearing cutter slidably mounted on said disc for movement in the direction of the axis thereof into and out of said groove, means driven by said motor for rotatably driving said disc, a cam slidably guided in said frame for movement into position to be engaged by said cutter, to effect movement of said cutter into said groove at predetermined periods in the cycle of rotation of said disc and cutter, and a geared drive connection from said disc to said cam for moving said cam into and out of position to be engaged by said cutter.

16. In an apparatus of the class described, a frame, means for measuring and shearing wire to length from a continuously moving wire, including two pinch rolls journaled on said frame for rotation about parallel axes, a motor on said frame, means driven by said motor for driving one of said pinch rolls, other means biasing the other of said pinch rolls into engagement with said pinch roll, a second set of pinch rolls journaled on said frame in spaced relation with respect to said first set of pinch rolls, means driven by said motor for driving one of said pinch rolls of said second set of pinch rolls at a higher speed of rotation than the speed of rotation of said first set of pinch rolls to maintain tension on the wire in the space between said pinch rolls, a rotary disc journaled on said frame in the space between said pinch rolls and having a wire guide groove recessed within the periphery thereof having a base in alignment with the points of engagement of said pinch rolls, means driven by said motor for rotatably driving said disc, a shearing cutter slidably mounted on said disc for axial movement into and out of said guide groove, a rectilinearly movement cutter engaging cam, means driven by said motor for rectilinearly moving said cam in timed relation with respect to rotation of said cutter, into position to be engaged of said cutter to effect an axial cutting movement thereof, and a guide member entering said guide groove on opposite sides of said disc and maintaining the wire along the base of said groove.

17. In a machine for fabricating welded wire mesh consisting of a plurality of uniformly spaced cross wires having a plurality of parallel spaced line wires secured thereto, a motor, a drum rotatably driven by said motor and comprising a cross wire magazine continuously driven by said motor to supply cross wires to the line wires and having a plurality of uniformly spaced cross wire receiving slots opening to the periphery thereof and to one end thereof, means measuring a continuously moving strand of wire and severing the wire into cross wires of predetermined uniform lengths, and means aligned with the path of travel of the wire through said measuring and severing means for feeding the severed cross wires to said slots through the open ends thereof during travel of said magazine, including two pinch rolls, means driving said pinch rolls at a predetermined speed of rotation, and cross wire guide means interposed between said pinch rolls and said magazine and facing the open ends of said slots including an apertured guide member for the cross wires, the apertured portion of which is closed on three sides and is open on the side thereof in the direction of travel of said magazine.

References Cited in the file of this patent

UNITED STATES PATENTS

| | | |
|---|---|---|
| 664,963 | Miller | Jan. 1, 1901 |
| 828,772 | Patterson | Aug. 14, 1906 |
| 1,175,516 | French | Mar. 14, 1916 |
| 1,261,773 | Conner | Apr. 9, 1918 |
| 1,367,212 | Southwick | Feb. 1, 1921 |
| 1,441,359 | Langston | Jan. 9, 1923 |
| 1,507,425 | Reed | Sept. 2, 1924 |
| 1,581,868 | Reed | Apr. 20, 1926 |
| 1,694,081 | Reed | Dec. 4, 1928 |
| 2,000,788 | Reed | May 7, 1935 |
| 2,046,461 | Johnson | July 7, 1936 |
| 2,105,386 | Wilcox et al. | Jan. 11, 1938 |
| 2,133,542 | Jensen | Oct. 18, 1938 |
| 2,294,369 | Harter | Sept. 1, 1942 |
| 2,368,047 | Southwick | Jan. 23, 1945 |
| 2,401,319 | Roemer | June 4, 1946 |
| 2,405,257 | Kehrer et al. | Aug. 6, 1946 |
| 2,410,766 | Wickwire | Nov. 5, 1946 |
| 2,441,837 | Ness et al. | May 18, 1948 |

FOREIGN PATENTS

| | | |
|---|---|---|
| 17,278 | Australia | Dec. 24, 1929 |